(12) United States Patent
Li et al.

(10) Patent No.: US 12,401,812 B2
(45) Date of Patent: Aug. 26, 2025

(54) METHOD AND APPARATUS FOR AFFINE MOTION REFINEMENT

(71) Applicant: Tencent America LLC, Palo Alto, CA (US)

(72) Inventors: Guichun Li, San Jose, CA (US); Xin Zhao, San Jose, CA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 133 days.

(21) Appl. No.: 18/380,523

(22) Filed: Oct. 16, 2023

(65) Prior Publication Data

US 2024/0137539 A1  Apr. 25, 2024

Related U.S. Application Data

(60) Provisional application No. 63/417,277, filed on Oct. 18, 2022.

(51) Int. Cl.
*H04N 19/44* (2014.01)
*H04N 19/105* (2014.01)
*H04N 19/159* (2014.01)
*H04N 19/176* (2014.01)

(52) U.S. Cl.
CPC .......... *H04N 19/44* (2014.11); *H04N 19/105* (2014.11); *H04N 19/159* (2014.11); *H04N 19/176* (2014.11)

(58) Field of Classification Search
CPC .............................. H04N 19/44; H04N 19/105
See application file for complete search history.

(56) References Cited

U.S. PATENT DOCUMENTS

| 10,778,999 | B2 * | 9/2020 | Li | H04N 19/70 |
| 11,197,003 | B2 * | 12/2021 | Zhang | H04N 19/109 |
| 11,202,081 | B2 * | 12/2021 | Zhang | H04N 19/117 |
| 11,252,433 | B2 * | 2/2022 | Furht | H04N 19/184 |

(Continued)

OTHER PUBLICATIONS

C. Muhammed, et al., Algorithm description of Enhanced Compression Model 6 (ECM 6), Joint Video Experts Team (JVET) of ITU-T SG 16 WP 3 and ISO/IEC JTC 1/SC 29 27th Meeting, by teleconference, Jul. 13-22, 2022, Document: JVET-AA2025, pp. 1-53.

*Primary Examiner* — Irfan Habib
(74) *Attorney, Agent, or Firm* — ArentFox Schiff LLP

(57) ABSTRACT

Processing circuitry determines an initial affine model with bi-prediction for a current block in an affine motion inter prediction mode, the initial affine model predicts the current block based on a first reference picture and a second reference picture. The processing circuitry performs a multi-stage bilateral matching motion refinement with at least a first stage and a second stage on the initial affine model to derive a refined affine model, one of the first stage and the second stage applies a first bilateral matching motion refinement on a translational component of the initial affine model, and the other of the first stage and the second stage applies a second bilateral matching motion refinement on a non-translational component of the initial affine model. The processing circuitry reconstructs the current block using the refined affine model based on the first reference picture and the second reference picture.

20 Claims, 11 Drawing Sheets

(56) References Cited

U.S. PATENT DOCUMENTS

| | | | | |
|---|---|---|---|---|
| 11,265,573 B2* | 3/2022 | Liu | ................... | H04N 19/186 |
| 11,310,508 B2* | 4/2022 | Liu | ................... | H04N 19/46 |
| 11,330,289 B2* | 5/2022 | Liu | ................... | H04N 19/70 |
| 11,356,697 B2* | 6/2022 | Zhang | ................... | H04N 19/42 |
| 11,368,711 B2* | 6/2022 | Zhang | ................... | H04N 19/577 |
| 11,431,965 B2* | 8/2022 | Liu | ................... | H04N 19/537 |
| 11,516,497 B2* | 11/2022 | Liu | ................... | H04N 19/105 |
| 11,570,462 B2* | 1/2023 | Zhang | ................... | H04N 19/176 |
| 11,677,973 B2* | 6/2023 | Zhang | ................... | H04N 19/139 |
| | | | | 375/240.12 |
| 11,706,443 B2* | 7/2023 | Liu | ................... | H04N 19/139 |
| | | | | 375/240.16 |
| 11,778,226 B2* | 10/2023 | Zhang | ................... | H04N 19/52 |
| | | | | 375/240.16 |
| 11,792,421 B2* | 10/2023 | Zhang | ................... | H04N 19/119 |
| | | | | 375/240.16 |
| 11,805,259 B2* | 10/2023 | Zhang | ................... | H04N 19/51 |
| 11,870,974 B2* | 1/2024 | Zhang | ................... | H04N 19/537 |
| 12,010,321 B2* | 6/2024 | Zhang | ................... | H04N 19/119 |
| 12,108,072 B2* | 10/2024 | Liu | ................... | H04N 19/176 |
| 12,160,564 B2* | 12/2024 | Li | ................... | H04N 19/172 |
| 12,200,244 B2* | 1/2025 | Zhang | ................... | H04N 19/105 |
| 12,278,985 B2* | 4/2025 | Liu | ................... | H04N 19/137 |
| 2018/0270500 A1* | 9/2018 | Li | ................... | H04N 19/52 |
| 2020/0213594 A1* | 7/2020 | Liu | ................... | H04N 19/537 |
| 2022/0239922 A1* | 7/2022 | Solovyev | ................... | H04N 19/176 |
| 2024/0022757 A1* | 1/2024 | Chen | ................... | H04N 19/52 |
| 2024/0314349 A1* | 9/2024 | Deng | ................... | H04N 19/577 |
| 2024/0323353 A1* | 9/2024 | Zhang | ................... | H04N 19/52 |
| 2024/0388694 A1* | 11/2024 | Deng | ................... | H04N 19/521 |
| 2025/0016346 A1* | 1/2025 | Chen | ................... | H04N 19/167 |

* cited by examiner

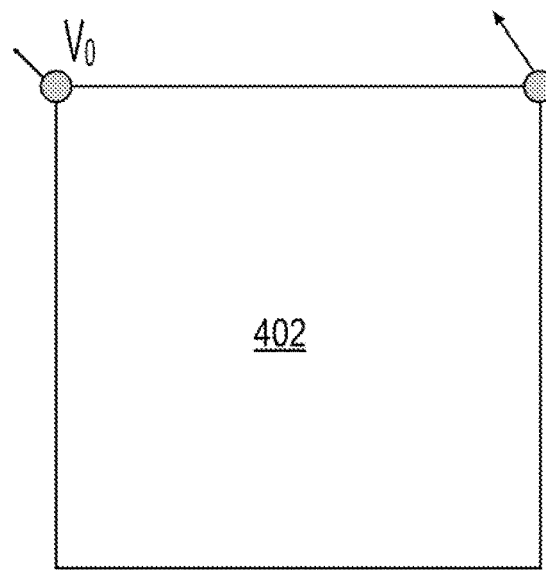
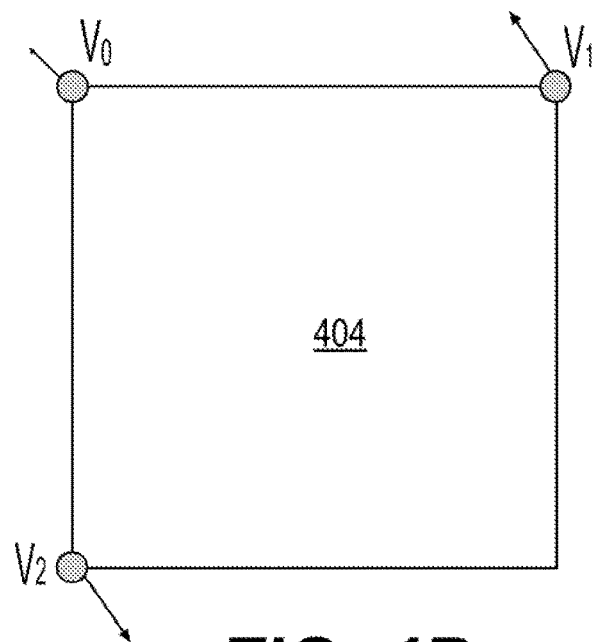
FIG. 4A  FIG. 4B
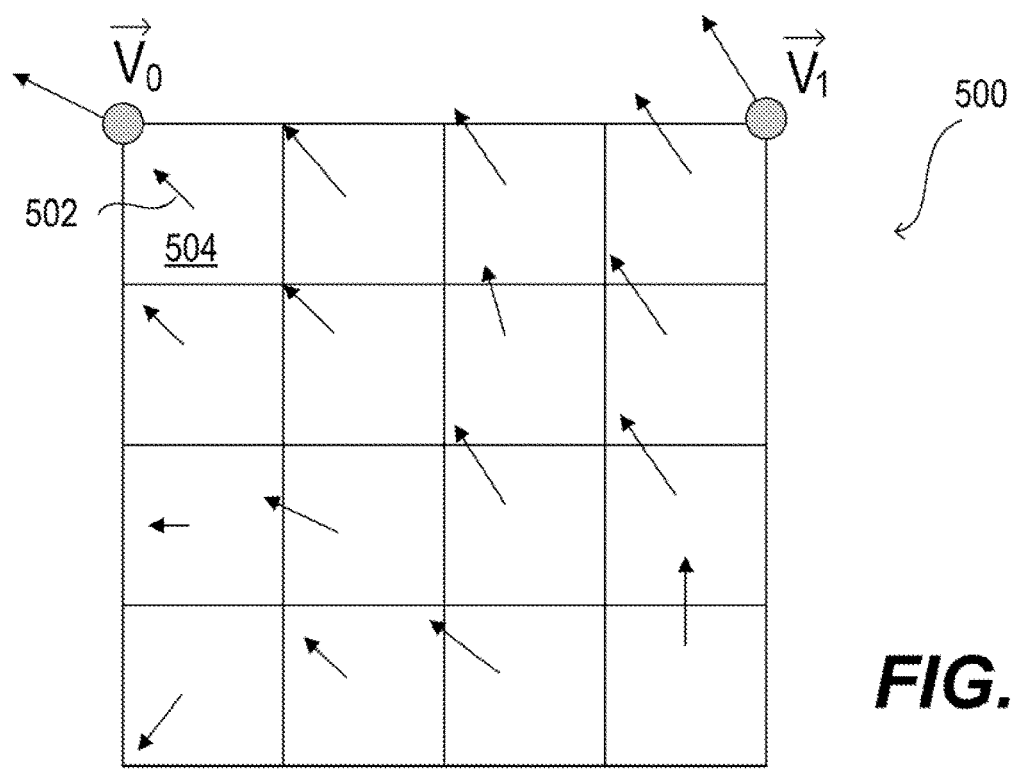
FIG. 5

METHOD AND APPARATUS FOR AFFINE MOTION REFINEMENT

INCORPORATION BY REFERENCE

The present application claims the benefit of priority to U.S. Provisional Application No. 63/417,277, "Method and Apparatus for Affine Motion Refinement" filed on Oct. 18, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives coded information of a current block in a current picture, the coded information indicates that the current block is coded in an affine motion inter prediction mode. The processing circuitry determines an initial affine model with bi-prediction for the current block, the initial affine model predicts the current block based on a first reference picture and a second reference picture. The processing circuitry performs a multi-stage bilateral matching motion refinement with at least a first stage and a second stage on the initial affine model to derive a refined affine model, one of the first stage and the second stage applies a first bilateral matching motion refinement on a translational component of the initial affine model, and the other of the first stage and the second stage applies a second bilateral matching motion refinement on a non-translational component of the initial affine model. The processing circuitry reconstructs the current block using the refined affine model based on the first reference picture and the second reference picture.

In some examples, the processing circuitry applies the first bilateral matching motion refinement on the translational component in the first stage before the second stage, and applies the second bilateral matching motion refinement on the non-translational component in the second stage after the first stage.

In some examples, the processing circuitry applies the second bilateral matching motion refinement on the non-translational component in the first stage before the second stage, and applies the first bilateral matching motion refinement on the translational component in the second stage after the first stage.

In some examples, for the first bilateral matching motion refinement, the processing circuitry determines a motion vector offset to apply to each of control point motion vectors of the initial affine model to minimize a bilateral matching cost value between a first affine prediction in the first reference picture and a second affine prediction in the second reference picture.

In some examples, for the second bilateral matching motion refinement, the processing circuitry determines, in a gradient based refinement iteration associated with a current affine model, a prediction output of the current block according to the current affine model, calculates gradients of prediction samples in the prediction output, solves a linear equation formed by the gradients to determine respectively delta values of control point motion vectors, determines whether one or more stop conditions are satisfied, determines a next affine model based on the delta values of the control point motion vectors in response to none of the one or more stop conditions being satisfied, the next affine model being input to a next gradient based refinement iteration, and stops the second bilateral matching motion refinement in response to the one or more stop conditions being satisfied.

In some examples, in response to the one or more stop conditions being satisfied, the processing circuitry determines, delta control point motion vectors for respective control point motion vectors based on a last affine model in a last gradient based refinement iteration of the second bilateral matching motion refinement.

In some examples, the processing circuitry stores, a plurality of bilateral matching costs that each is associated with an affine model used in one of a plurality of gradient based refinement iterations of the second bilateral matching motion refinement, determines, a lowest bilateral matching cost from the plurality of bilateral matching costs, and determines, delta control point motion vectors for respective control point motion vectors based on an affine model associated with the lowest bilateral matching cost.

In some examples, the refined affine model is formed by refined control point motion vectors, the refined control point motion vectors include a motion vector offset that is derived by the first bilateral matching motion refinement and is applied to each of the refined control point motion vectors, and delta control point motion vectors that are derived by the second bilateral matching motion refinement and are applied on respective control point motion vectors.

In some examples, the multi-stage bilateral matching motion refinement on the initial affine model includes at least a third stage that applies a third bilateral matching motion refinement on control point motion vectors at control points of the current block.

In some examples, the third stage is performed before the first stage and the second stage, or the third stage is performed between the first stage and the second stage, or the third stage is performed after the first stage and the second stage.

In some examples, the third stage applies a third bilateral matching motion refinement having one or more iterations respectively for one or more control points of the current block. The processing circuitry determines, in an iteration for a control point, a pair of refined control point motion vectors at the control point, that minimizes a bilateral matching cost between a first affine prediction in the first reference picture and a second affine prediction in the second reference picture.

In some examples, the third stage applies a third bilateral matching motion refinement having one or more iterations respectively for one or more combinations of N control points, N is a positive integer larger than 1 and smaller than a total number of control points. The processing circuitry determines, in an iteration for a combination of N control points, a motion vector offset to apply to each of control point motion vectors at the N control points in the combination that minimizes a bilateral matching cost value between a first affine prediction in the first reference picture and a second affine prediction in the second reference picture.

In some examples, the processing circuitry determines a first motion vector for a subblock of the current block coded in the affine motion inter prediction mode according to the initial affine model, and applying a decoder side motion vector refinement (DMVR) to determine a second motion vector with a refinement on the first motion vector for the subblock. The second motion vector with the refinement on the first motion vector minimizes a bilateral matching cost between a first reference subblock in the first reference picture and a second reference subblock in the second reference picture. The processing circuitry reconstructs the subblock according to the second motion vector for the subblock.

In some examples, the processing circuitry stores the first motion vector in a subblock buffer for the subblock, the first motion vector in the subblock buffer can be used for motion vector prediction for another block.

In some examples, the processing circuitry stores the second motion vector in a subblock buffer for the subblock, the second motion vector in the subblock buffer can be used for motion vector prediction for another block.

In some examples, the processing circuitry determines refined motion vectors respectively for subblocks of the current block, determines a regression model based on the refined motion vectors for the subblocks, derives refined control point motion vectors for the refined affine model of the current block according to the regression model, and reconstructs the current block according to the refined control point motion vectors.

In some examples, the processing circuitry stores control point motion vectors of the initial affine model in a buffer associated with the current block, the control point motion vectors can be used for an affine inheritance.

In some examples, the processing circuitry stores the refined control point motion vectors of the refined affine model in a buffer associated with the current block, the refined control point motion vectors can be used for an affine inheritance.

In some examples, the processing circuitry stores control point motion vectors of the initial affine model in a buffer associated with the current block, the control point motion vectors can be used for an affine inheritance.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which:

FIGS. 4A-4B show affine models in some examples.

FIG. 5 shows affine motion vector field per subblock in an example.

DETAILED DESCRIPTION OF EMBODIMENTS

Figure 1:
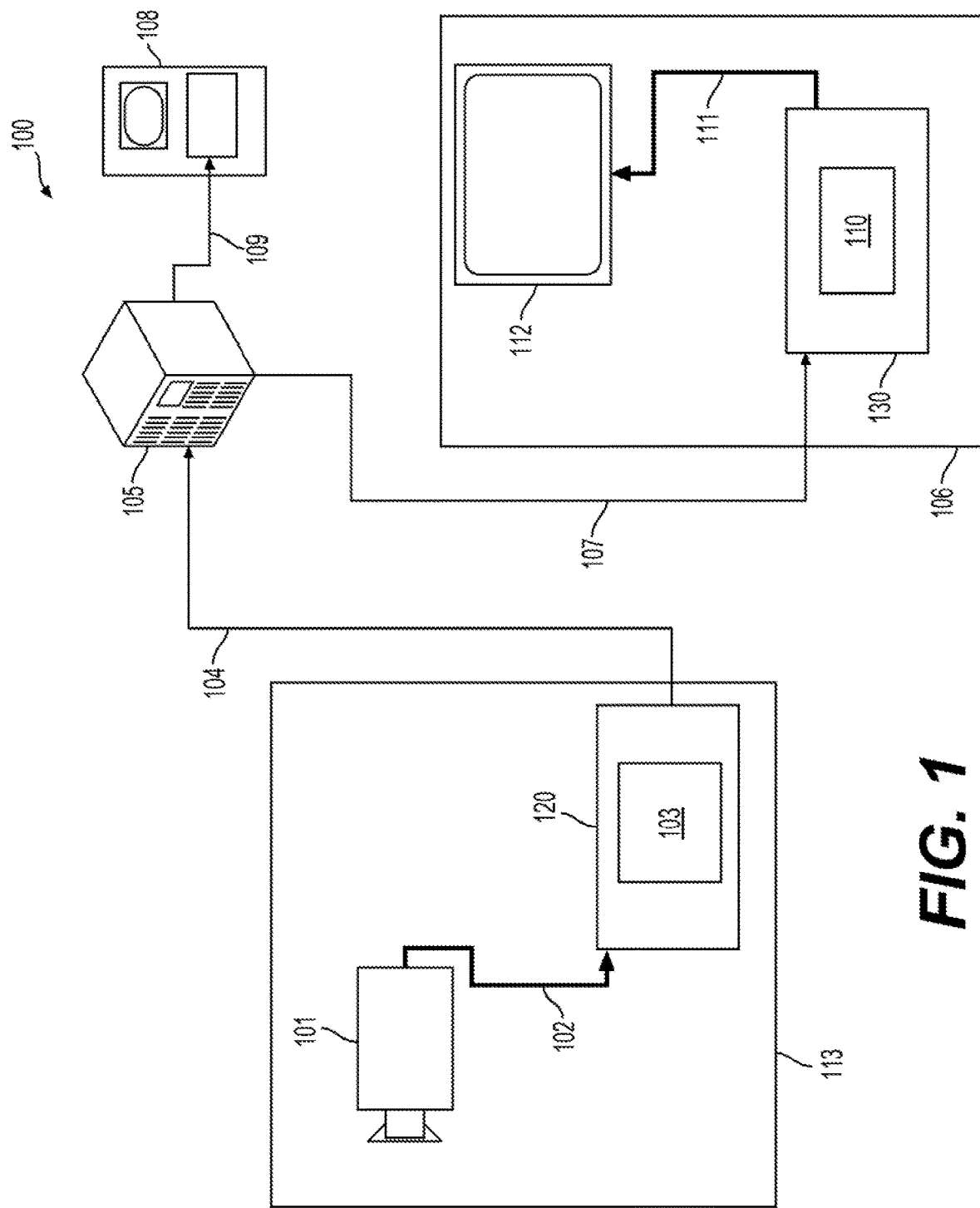
FIG. 1 is a schematic illustration of an exemplary block diagram of a communication system.

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
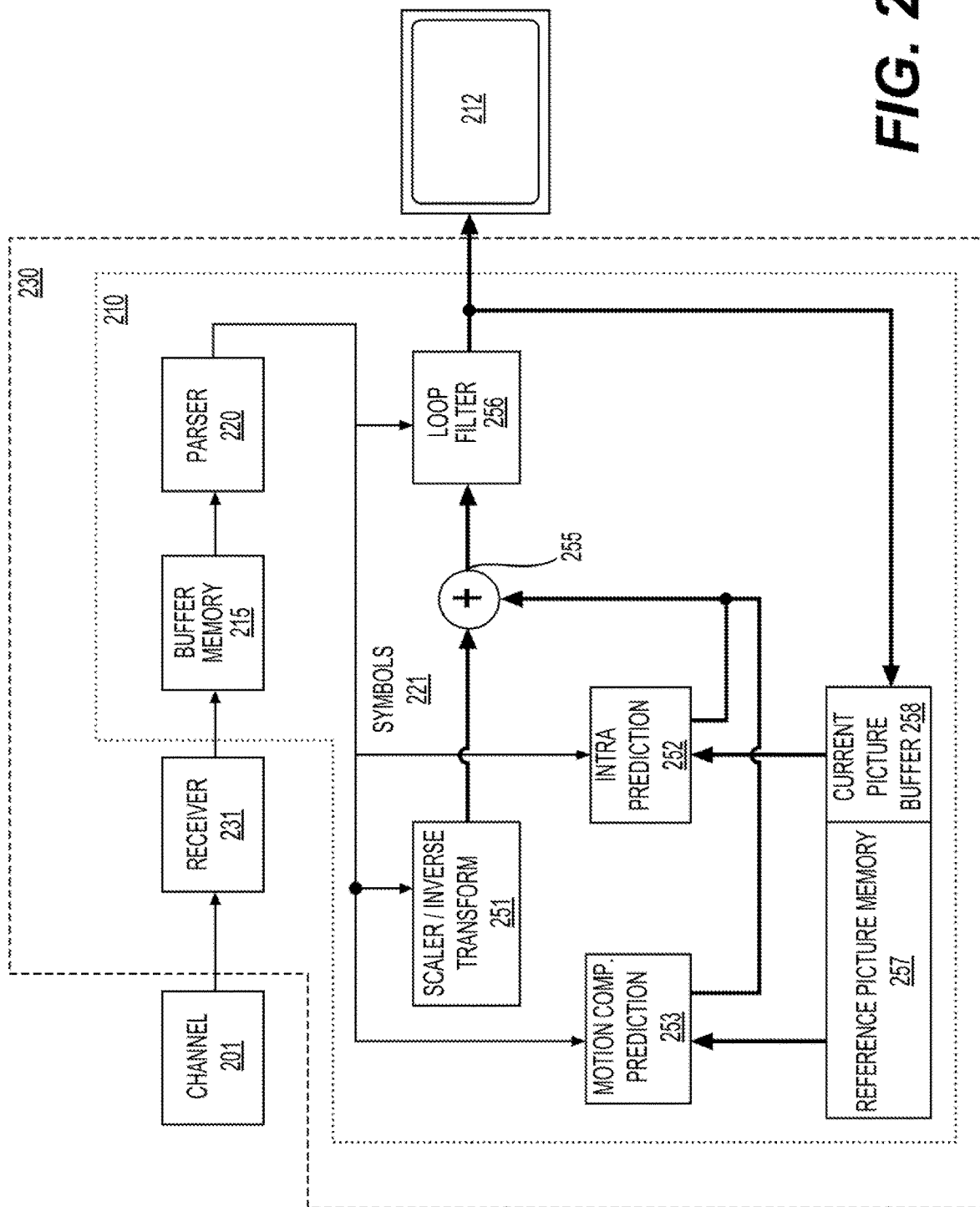
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
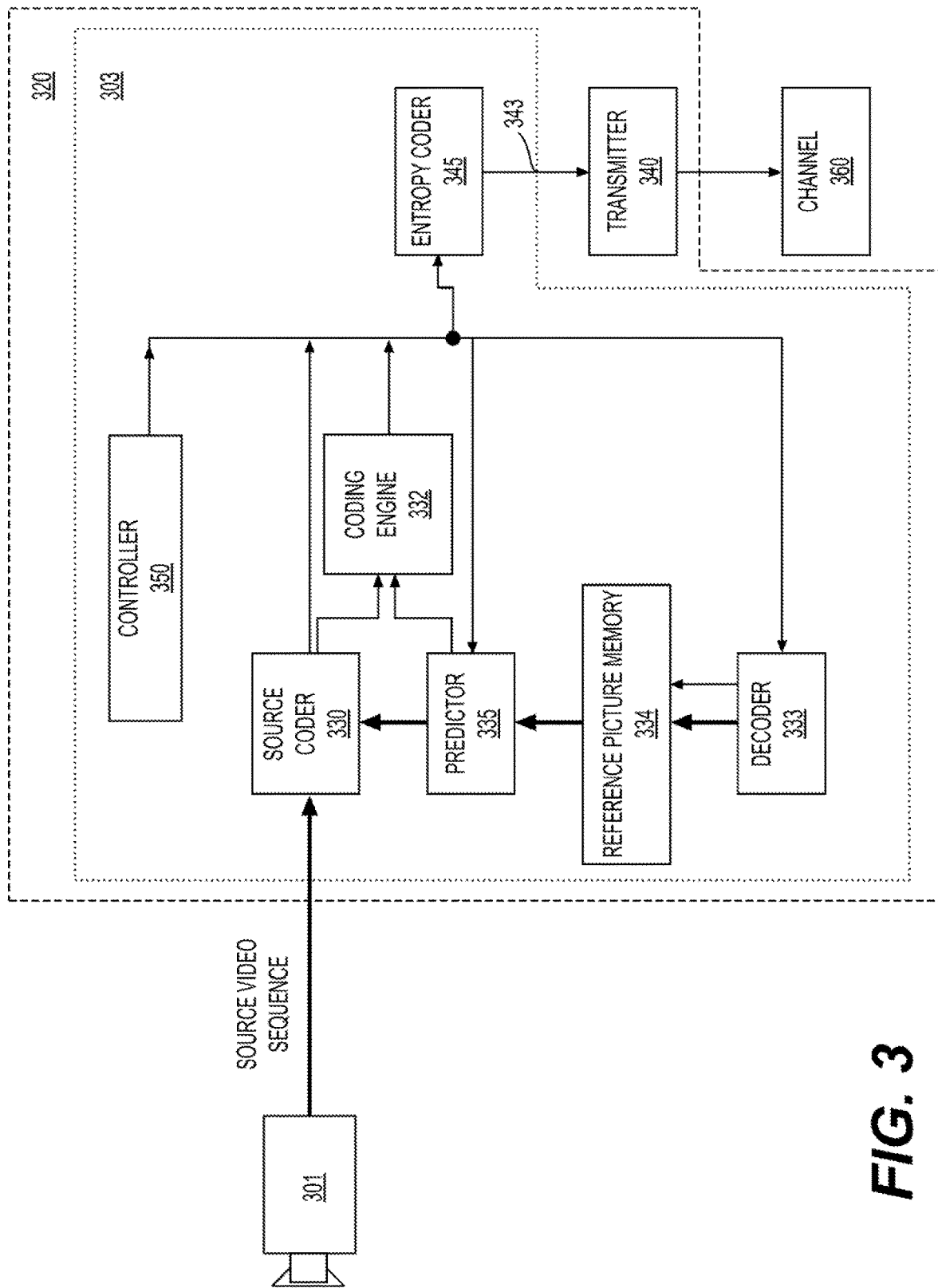
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create.

The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for affine motion refinement. In some examples, the techniques can be applied to blocks in the affine motion inter prediction mode with bi-prediction.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Some inter predictions and related methods are described in details below.

In HEVC, a translational motion model is applied for motion compensation prediction (MCP). Translational motion is the motion in which all points of a moving body move uniformly in the same line or direction, thus a motion vector can be used to define the motion of the motion body. While in the real world, many kinds of motions can exist, such as zoom in/out, rotation, perspective motions, and other irregular motions. Non-translational motion refers to a motion that points of the moving body do not move uniformly. Some motion models can include translational component for the translational motion and non-translational component for the non-translational motion.

A block-based affine transform motion compensation prediction can be applied, such as in VTM. FIG. 4A shows an affine motion field of a block (402) described by motion information of two control points (4-parameter). FIG. 4B shows an affine motion field of a block (404) described by three control point motion vectors (6-parameter).

As shown in FIG. 4A, in the 4-parameter affine motion model, a motion vector at a sample location (x,y) in the block (402) can be derived in Eq. (1) as follows:

$$\begin{cases} mv_x = \dfrac{mv_{1x} - mv_{0x}}{W}x + \dfrac{mv_{1y} - mv_{0y}}{W}y + mv_{0x} \\ mv_y = -\dfrac{mv_{1y} - mv_{0y}}{W}x + \dfrac{mv_{1x} - mv_{0x}}{W}y + mv_{0y} \end{cases} \quad \text{Eq. (1)}$$

where $mv_x$ can be the motion vector in a first direction (or X direction) and $mv_y$ can be the motion vector in a second direction (or Y direction). The motion vector can also be described in Eq. (2):

$$\begin{cases} mv_x = ax + by + c \\ mv_y = -bx + ay + f \end{cases} \quad \text{Eq. (2)}$$

As shown in FIG. 4B, in the 6-parameter affine motion model, a motion vector at a sample location (x,y) in the block (404) can be derived in Eq. (3) as follows:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{Eq. (3)}$$

The 6-parameter affine motion model can also described in Eq. (4) as follows:

$$\begin{cases} mv_x = ax + by + c \\ mv_y = dx + ey + f \end{cases} \quad \text{Eq. (4)}$$

As shown in Eq. (1) and Eq. (3), $(mv_{0x}, mv_{0y})$ can be a motion vector of a top-left corner control point. $(mv_{1x}, mv_{1y})$ can be motion vector of a top-right corner control point. $(mv_{2x}, mv_{2y})$ can be a motion vector of a bottom-left corner control point.

As shown in FIG. 5, to simplify the motion compensation prediction, block based affine transform prediction can be applied. To derive a motion vector of each 4×4 luma sub-block, a motion vector of a center sample (e.g., (502)) of each sub-block (e.g., (504)) in a current block (500) can be calculated according to the equations (1)-(4), and rounded to 1/16 fraction accuracy. Motion compensation interpolation filters can then be applied to generate the prediction of each sub-block with the derived motion vector. A sub-block size of chroma-components can also be set as 4×4. The MV of a 4×4 chroma sub-block can be calculated as an average of MVs of four corresponding 4×4 luma sub-blocks.

In affine merge prediction, an affine merge (AF_MERGE) mode can be applied for CUs with both a width and a height larger than or equal to 8. CPMVs of a current CU can be generated based on motion information of spatial neighboring CUs. Up to five CPMVP candidates can be applied for the affine merge prediction and an index can be signalled to indicate which one of the five CPMVP candidates can be used for the current CU. In affine merge prediction, three types of CPMV candidate can be used to form the affine merge candidate list: (1) inherited affine merge candidates that are extrapolated from CPMVs of neighbour CUs, (2) constructed affine merge candidates with CPMVPs that are derived using translational MVs of neighbour CUs, and (3) Zero MVs.

Figure 6:
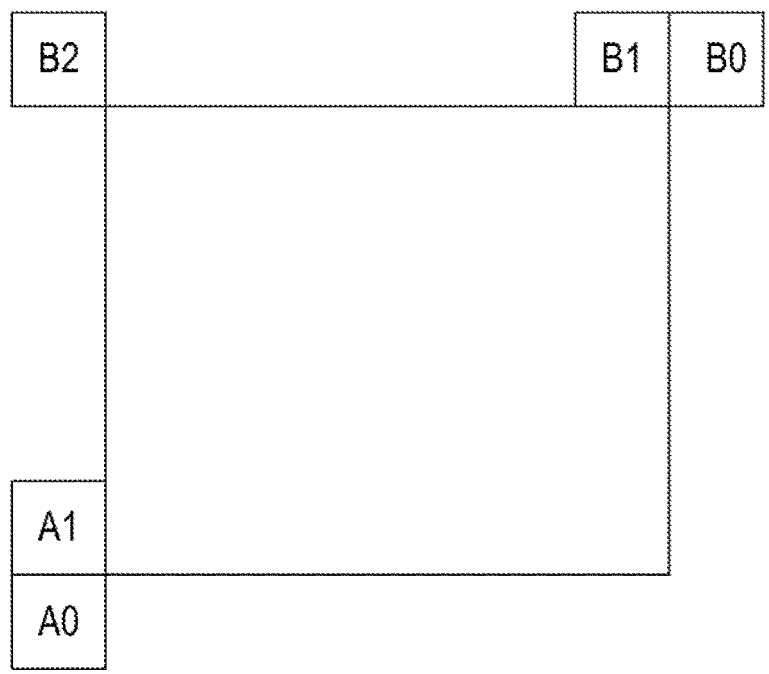
FIG. 6 shows positions of spatial merge candidates in some examples.
Figure 7:
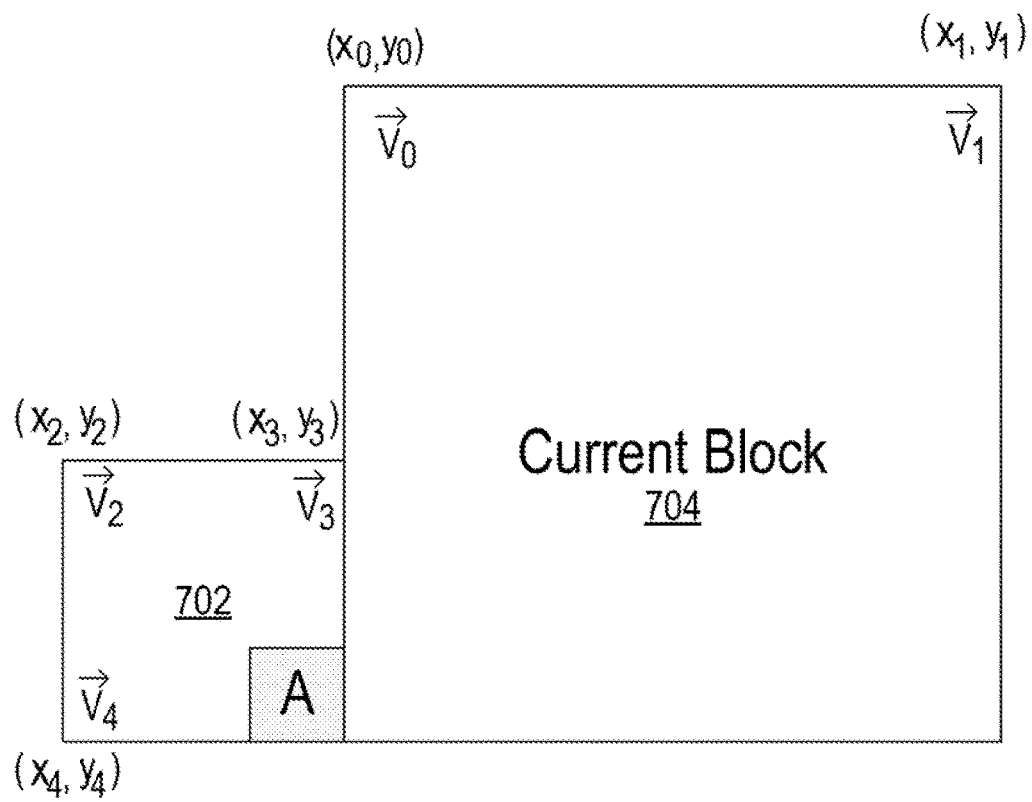
FIG. 7 shows control point motion vector inheritance in some examples.

In VTM3, a maximum of two inherited affine candidates can be applied. The two inherited affine candidates can be derived from an affine motion model of neighboring blocks. For example, one inherited affine candidate can be derived from left neighboring CUs and the other inherited affine candidate can be derived from above neighboring CUs. Exemplary candidate blocks can be shown in FIG. 6. As shown in FIG. 6, for a left predictor (or a left inherited affine candidate), a scan order can be A0->A1, and for an above predictor (or an above inherited affine candidate), a scan order can be B0->B1->B2. Thus, only the first available inherited candidate from each side can be selected. No pruning check may be performed between two inherited candidates. When a neighboring affine CU is identified, control point motion vectors of the neighboring affine CU can be used to derive the CPMVP candidate in the affine merge list of the current CU. As shown in FIG. 7, when a neighboring left bottom block A of a current block (704) is coded in affine mode, motion vectors $v_2$, $v_3$ and $v_4$ of a top left corner, an above right corner, and a left bottom corner of a CU (702) which contains the block A can be attained. When the block A is coded with 4-parameter affine model, two CPMVs of the current CU (704) can be calculated according to $v_2$, and $v_3$ of the CU (702). In a case that block A is coded with a 6-parameter affine model, three CPMVs of the current CU (704) can be calculated according to $v_2$, $v_3$ and $v_4$ of the CU (702).

Figure 8:
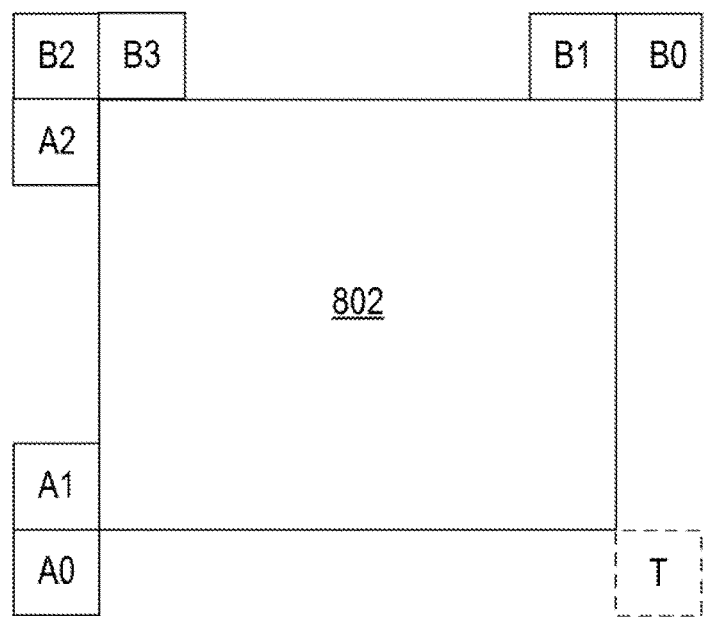
FIG. 8 shows locations of candidate positions for constructed affine merge mode in some examples.

A constructed affine candidate of a current block can be a candidate that is constructed by combining neighbor translational motion information of each control point of the current block. The motion information of the control points can be derived from specified spatial neighbors and a temporal neighbor that can be shown in FIG. 8. As shown in FIG. 8, $CPMV_k$ (k=1, 2, 3, 4) represents a k-th control point of a current block (802). For $CPMV_1$, B2->B3->A2 blocks can be checked and an MV of the first available block can be used. For $CPMV_2$, B1->B0 blocks can be checked. For $CPMV_3$, A1->A0 blocks can be checked. TMVP can be used as $CPMV_4$ if $CPMV_4$ is not available.

After MVs of four control points are attained, affine merge candidates can be constructed for the current block (802) based on motion information of the four control points. For example, the affine merge candidates can be constructed based on combinations of the MVs of the four control points in an order as follows: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, and {$CPMV_1$, $CPMV_3$}.

The combination of 3 CPMVs can construct a 6-parameter affine merge candidate and the combination of 2 CPMVs can construct a 4-parameter affine merge candidate. To avoid a motion scaling process, if reference indices of control points are different, a related combination of control point MVs can be discarded.

After inherited affine merge candidates and constructed affine merge candidate are checked, if the list is still not full, zero MVs can be inserted to an end of the list.

In affine AMVP prediction, an affine AMVP mode can be applied for CUs with both a width and a height larger than or equal to 16. An affine flag in CU level can be signalled in the bitstream to indicate whether affine AMVP mode is used and then another flag can be signaled to indicate whether a 4-parameter affine or a 6-parameter affine is applied. In affine AMVP prediction, a difference of CPMVs of a current CU and predictors of the CPMVPs of the current CU can be signalled in the bitstream. A size of an affine AMVP candidate list can be 2 and the affine AMVP candidate list can be generated by using four types of CPMV candidate in an order as follows:

(1) Inherited affine AMVP candidates that are extrapolated from the CPMVs of the neighbour CUs, (2) Constructed affine AMVP candidates with CPMVPs that are derived using the translational MVs of the neighbour CUs,
(3) Translational MVs from neighboring CUs, and
(4) Zero MVs.

A checking order of inherited affine AMVP candidates can be the same as a checking order of inherited affine merge candidates. To determine an AMVP candidate, only an affine CU that has the same reference picture as the current block can be considered. No pruning process may be applied when an inherited affine motion predictor is inserted into the candidate list.

A constructed AMVP candidate can be derived from specified spatial neighbors. As shown in FIG. 8, the same checking order can be applied as the checking order in affine merge candidate construction. In addition, a reference picture index of a neighboring block can also be checked. A first block in the checking order can be inter coded and have the same reference picture as the current CU (802). One constructed AMVP candidate can be determined when the current CU (802) is coded with a 4-parameter affine mode, and $mv_0$ and $mv_1$ are both available. The constructed AMVP candidate can further be added to the affine AMVP list. When the current CU (802) is coded with a 6-parameter affine mode, and all three CPMVs are available, the constructed AMVP candidate can be added as one candidate in the affine AMVP list. Otherwise, the constructed AMVP candidate can be set as unavailable.

If candidates in the affine AMVP list are still less than 2 after the inherited affine AMVP candidates and the constructed AMVP candidate are checked, $mv_0$, $mv_1$ and $mv_2$ can be added, in order. The $mv_0$, $mv_1$ and $mv_2$ can function as translational MVs to predict all control point MVs of the current CU (e.g., (802)) when available. Finally, zero MVs can be used to fill the affine AMVP list if the affine AMVP is still not full.

Subblock-based affine motion compensation can save memory access bandwidth and reduce computation complexity compared to pixel based motion compensation, at the cost of a prediction accuracy penalty. To achieve a finer granularity of motion compensation, prediction refinement with optical flow (PROF) can be used to refine the subblock-based affine motion compensated prediction without increasing the memory access bandwidth for motion compensation. In VVC, after the subblock-based affine motion compensation is performed, a luma prediction sample can be refined by adding a difference derived by an optical flow equation. The PROF can be described in four steps as follows:

Step (1): the subblock-based affine motion compensation can be performed to generate subblock prediction I(i,j).
Step (2): spatial gradients $g_x(i,j)$ and $g_y(i,j)$ of the subblock prediction can be calculated at each sample location using a 3-tap filter [−1, 0, 1]. The gradient calculation can be the same as gradient calculation in BDOF. For example, the spatial gradients $g_x(i,j)$ and $g_y(i,j)$ can be calculated based on Eq. (5) and Eq. (6) respectively.

$$g_x(i,j)=(I(i+1,j)>>\text{shift1})-(I(i-1,j)>>\text{shift1}) \qquad \text{Eq. (5)}$$

$$g_y(i,j)=(I(i,j+1)>>\text{shift1})-(I(i,j-1)>>\text{shift1}) \qquad \text{Eq. (6)}$$

As shown in equations (5) and (6), shift1 can be used to control a precision of the gradient. Subblock (e.g., 4×4) prediction can be extended by one sample on each side for the gradient calculation. To avoid additional memory bandwidth and additional interpolation computation, extended samples on extended borders can be copied from a nearest integer pixel position in the reference picture.

Figure 9:
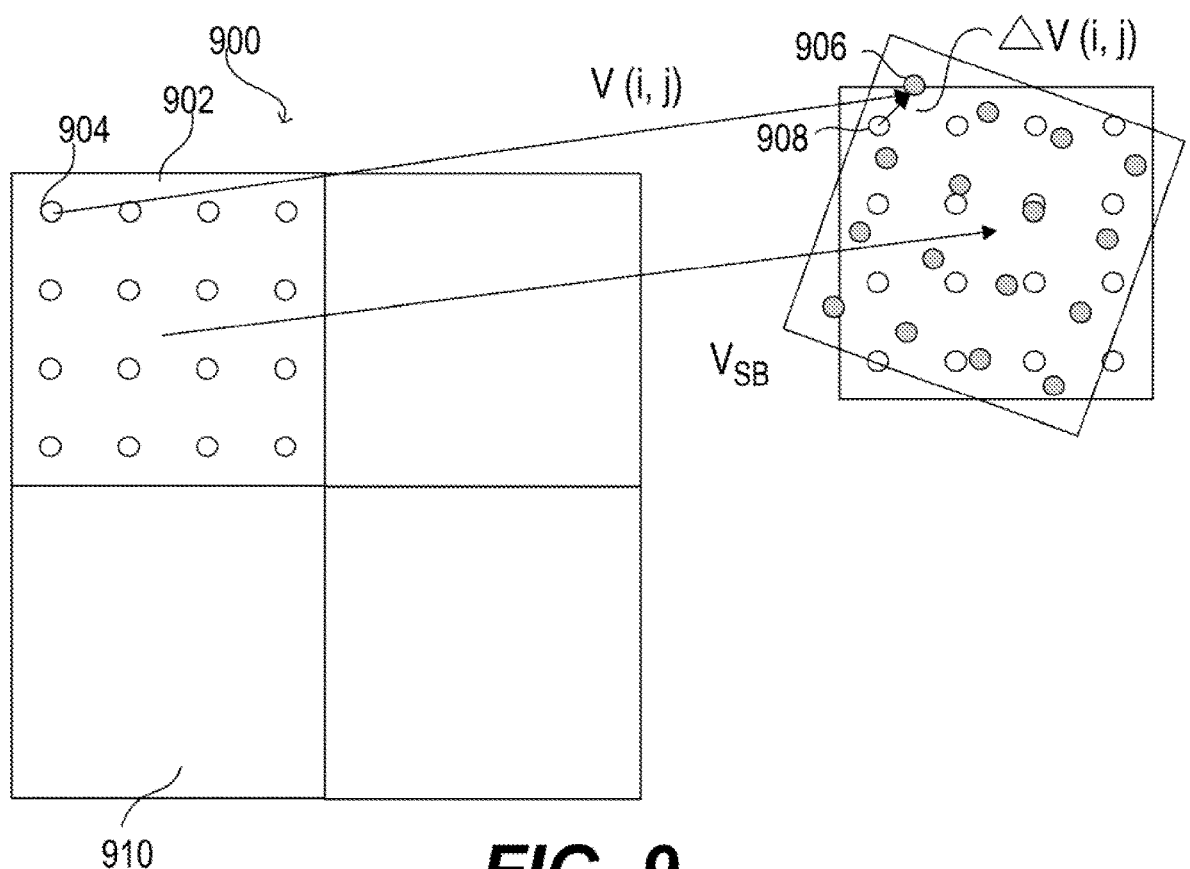
FIG. 9 shows difference between sample motion vector and subblock motion vector in some examples.

Step (3): luma prediction refinement can be calculated by an optical flow equation as shown in Eq. (7).

$$\Delta I(i,j)=g_x(i,j)*\Delta v_x(i,j)+g_y(i,j)*\Delta v_y(i,j) \qquad \text{Eq. (7)}$$

where $\Delta v(i,j)$ can be a difference between a sample MV computed for a sample location (i,j), denoted by v(i,j), and a subblock MV, denoted by $v_{SB}$, of a subblock to which the sample (i,j) belongs. FIG. 9 shows an exemplary illustration of the difference between the sample MV and the subblock MV. As shown in FIG. 9, a subblock (902) is in a current block (900) and a sample (904) is in the subblock (902). According to a sample motion vector v(i,j), the sample (904) can correspond to a reference pixel (906). The subblock (902) has a subblock motion vector $v_{SB}$. Based on the subblock motion vector $v_{SB}$, the sample (904) can correspond to a reference pixel (908). A difference between the sample MV and the subblock MV, denoted by $\Delta v(i,j)$, can be indicated by a difference between the reference pixel (906) and the reference pixel (908). The $\Delta v(i,j)$ can be quantized in a unit of 1/32 luma sample precision.

Since affine model parameters and a sample location relative to a subblock center may not be changed from a subblock to another subblock, $\Delta v(i,j)$ can be calculated for a first subblock (e.g., (902)), and reused for other subblocks (e.g., (910)) in the same CU (e.g., (900)). Let dx(i,j) be a horizontal offset and dy(i,j) be a vertical offset from a sample location (i,j) to a center of a subblock ($x_{SB}$,$y_{SB}$), $\Delta v(x,y)$ can be derived by Eq. (8) and Eq. (9) as follows:

$$\begin{cases} dx(i,j) = i - x_{SB} \\ dy(i,j) = j - y_{SB} \end{cases} \qquad \text{Eq. (8)}$$

$$\begin{cases} \Delta v_x(i,j) = C*dx(i,j) + D*dy(i,j) \\ \Delta v_y(i,j) = E*dx(i,j) + F*dy(i,j) \end{cases} \qquad \text{Eq. (9)}$$

In order to keep accuracy, the center of the subblock ($x_{SB}$,$y_{SB}$) can be calculated as (($W_{SB}$−1)/2, ($H_{SB}$−1)/2), where $W_{SB}$ and $H_{SB}$ are the subblock width and height, respectively.

Once $\Delta v(x,y)$ is obtained, parameters of the affine model can be obtained. For example, for a 4-parameter affine model, the parameters of the affine model can be shown in Eq. (10).

$$\begin{cases} C = F = \dfrac{v_{1x} - v_{0x}}{w} \\ E = -D = \dfrac{v_{1y} - v_{0y}}{w} \end{cases} \qquad \text{Eq. (10)}$$

For a 6-parameter affine model, the parameters of the affine model can be shown in Eq. (11).

$$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \qquad \text{Eq. (11)}$$

where ($v_{0x}$,$v_{0y}$), ($v_{1x}$,$v_{1y}$), ($v_{2x}$,$v_{2y}$) can be a top-left control point motion vector, a top-right control point motion vector, and a bottom-left control point motion vector respectively, and w and h can be a width and a height of the CU respectively.

Step (4): finally, the luma prediction refinement ΔI(i,j) can be added to the subblock prediction I(i,j). A final prediction I' can be generated as shown in Eq. (12).

$$I'(i,j)=I(i,j)+\Delta I(i,j) \quad \text{Eq. (12)}$$

PROF may not be applied in two cases for an affine coded CU: (1) all control point MVs are the same, which indicates that the CU only has translational motion, and (2) the affine motion parameters are greater than a specified limit because the subblock-based affine MC is degraded to CU-based MC to avoid a large memory access bandwidth requirement.

In some examples, a technique that is referred to as affine motion vector difference (MVD) coding is used in the affine mode. When coded in the affine AMVP mode, each control point of an affine coding block has a motion vector difference (MVD). For each reference picture, the MVD of control points are calculated from the actual CPMV values and the affine AMVP predictor's CPMV values.

In an example, for 4-parameter affine, two MVDs (denoted by $MVD_0$, and $MVD_1$) are coded for each reference list according to Eq. (13) and Eq. (14):

$$MVD_0=MV_0-MVP_0 \quad \text{Eq. (13)}$$

$$MVD_1=MV_1-MVP_1-MVD_0 \quad \text{Eq. (14)}$$

where $MV_0$ and $MV_1$ denote the actual CPMV values of two control points, and $MVP_0$ and $MVP_1$ denote the affine AMVP predictor's CPMV values of two control points.

In another example, for 6-parameter affine, three MVDs (denoted by $MVD_0$, $MVD_1$ and $MVD_2$) are coded for each reference list according to Eq. (15), Eq. (16) and Eq. (17):

$$MVD_0=MV_0-MVP_0 \quad \text{Eq. (15)}$$

$$MVD_1=MV_1-MVP_1-MVD_0 \quad \text{Eq. (16)}$$

$$MVD_2=MV_2-MVP_2-MVD_0 \quad \text{Eq. (17)}$$

where $MV_0$, $MV_1$ and $MV_2$ denote the actual CPMV values of three control points, and $MVP_0$, $MVP_1$ and $MVP_2$ denote the affine AMVP predictor's CPMV values of three control points.

Affine motion estimation (ME), such as in VVC reference software VTM, can be operated for both uni-prediction and bi-prediction. The uni-prediction can be performed on one of a reference list L0 and a reference list L1 and the bi-prediction can be performed on both the reference list L0 and the reference list L1.

Figure 10:
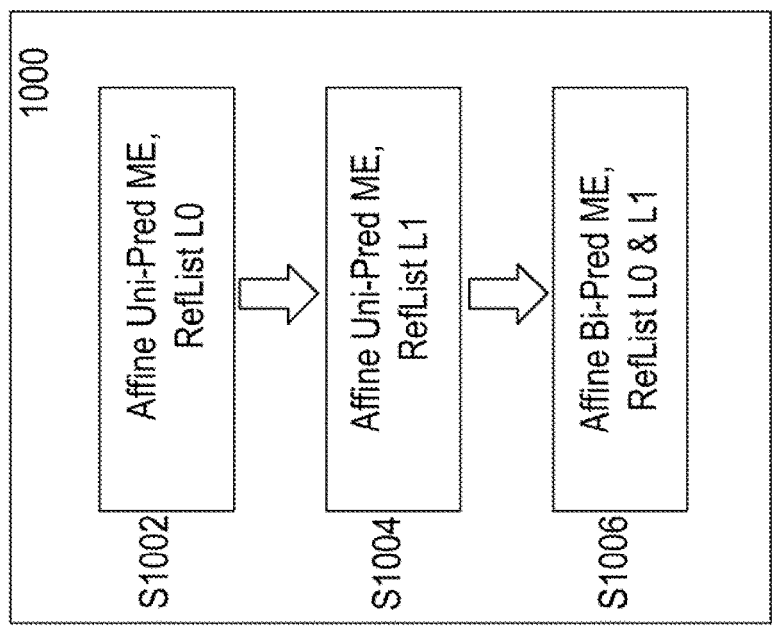
FIG. 10 shows a schematic illustration of affine motion estimation in some examples.

FIG. 10 shows a schematic illustration of affine ME (1000). As shown in FIG. 10, in affine ME (1000), an affine uni-prediction (S1002) can be performed on the reference list L0 to obtain a prediction P0 (also referred to as reference prediction P0 in the reference list L0 or affine prediction P0) of a current block based on an initial reference block in the reference list L0. An affine uni-prediction (S1004) can also be performed on the reference list L1 to obtain a prediction P1 (also referred to as reference prediction P1 in the reference list L1 or affine prediction P1) of the current block based on an initial reference block in the reference list L1. At (S1006), an affine bi-prediction can be performed. The affine Bi-prediction (S1006) can start with an initial prediction residue (2I-P0)-P1, where I can be initial values of the current block. The affine bi-prediction (S1006) can search candidates in the reference list L1 around the initial reference prediction in the reference list L1 to find a best (or selected) reference prediction that has a minimum prediction residue (2I-P0)-Px, where Px is prediction of the current block based on the selected reference prediction.

With a reference picture, for a current coding block, the affine ME process can first pick a set of control point motion vectors (CPMVs) as a base. An iterative method can be used to generate a prediction output of a current affine model that corresponds to the set of CPMVs, calculate gradients of prediction samples, and then solve a linear equation to determine delta CPMVs to optimize affine prediction. The iterations can stop when all the delta CPMVs are 0, or a maximum number of iterations is reached. The CPMVs obtained from the iterations can be final CPMVs for the reference picture.

After the best affine CPVMs on both the reference list L0 and L1 are determined for affine uni-prediction, affine bi-prediction searching can be performed using the best uni-prediction CPMVs and a reference list on one side, and searching for best CPMVs on the other reference list to optimize affine bi-prediction output. The affine bi-prediction search can be performed iteratively on the two reference lists to obtain optimal results.

Figure 11:
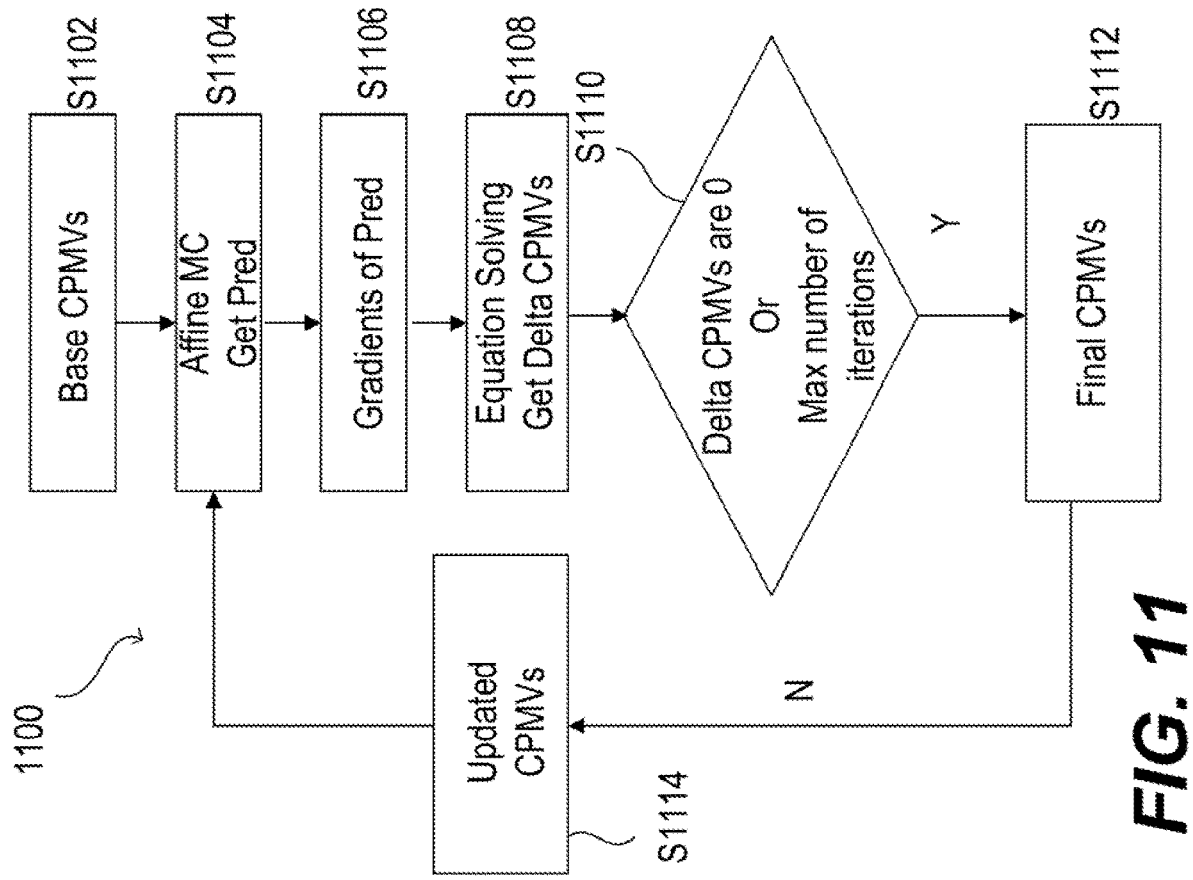
FIG. 11 shows a search process for affine motion estimation process in some examples.

FIG. 11 shows an exemplary affine ME process (1100) in which final CPMVs associated with a reference picture can be calculated. The affine ME process (1100) can start with (S1102). At (S1102), base CPMVs of a current block can be determined. The base CPMVs can be determined based on one of a merge index, an advanced motion vector prediction (AMVP) predictor index, an affine merge index, or the like.

At (S1104), an initial affine prediction of the current block can be obtained based on the base CPMVs. For example, according to the base CPMVs, a 4-parameter affine motion model of a 6-parameter affine motion model can be applied to generate the initial affine prediction.

At (S1106), gradients of the initial affine prediction can be obtained. For example, the gradients of the initial affine prediction can be obtained based on equations (5) and (6).

At (S1108), delta CPMVs can be determined. In some embodiments, the delta CPMVs can be associated with a displacement between the initial affine prediction and a subsequent affine prediction, such as a first affine prediction. Based on the gradients of the initial affine prediction and the delta CPMVs, first affine prediction can be obtained. The first affine prediction can correspond to first CPMVs.

At (S1110), a determination can be made to check whether the delta CPMVs are zero or an iteration number is equal to or larger than a threshold value. When the delta CPMVs are zero or the iteration number is equal to or larger than the threshold value, final (or selected) CPMVs can be determined at (S1112). The final (or selected) CPMVs can be the first CPMVs that are determined based on the gradients of the initial affine prediction and the delta CPMVs.

Still referring to (S1110), when the delta CPMVs are not zero or the iteration number is less than the threshold value, a new iteration can start. In the new iteration, updated CPMVs (e.g., the first CPMVs) can be provided to (S1104) to generate an updated affine prediction. The affine ME process (1100) can then proceed to (S1106), where gradients of the updated affine prediction can be calculated. The affine ME process (1100) can then proceed to (S1108) to continue the new iteration.

In an affine motion model, a 4-parameter affine motion model can further be described by formulas that include motions of rotation and zooming. For example, a 4-parameter affine motion model can be rewritten in equations (18) as follows:

$$\begin{cases} mv_x = ax + by + c = (r \cdot \cos\theta - 1) \cdot x + r \cdot \sin\theta \cdot y + c \\ mv_y = -bx + ay + f = -r \cdot \sin\theta \cdot x + (r \cdot \cos\theta - 1) \cdot y + f \end{cases} \quad \text{Eq. (18)}$$

where r and θ can be a zooming factor and a rotation angle, respectively. When a current frame is temporally in a middle of two reference frames, and if the motion is constant and continuous, the zooming factor can be exponential while the rotation angle can be constant. Therefore, equation (18) can be applied to formulate an affine motion to one reference, such as an affine motion to a reference list 0. An affine motion to another reference frame that is temporally on another side of the current frame, such as a reference list 1, can be described in equation (19).

$$\begin{cases} mv_x = \left(\frac{1}{r} \cdot \cos(-\theta) - 1\right) \cdot x + \frac{1}{r} \cdot \sin(-\theta) \cdot y - c \\ mv_y = -\frac{1}{r} \cdot \sin(-\theta) \cdot x + \left(\frac{1}{r} \cdot \cos(-\theta) - 1\right) \cdot y - f \end{cases} \quad \text{Eq. (19)}$$

Equations (18) and (19) can be called a symmetric affine motion model. The symmetric affine motion model can be applied to further improve coding efficiency. It should be noted that relationships between a, b, r, and θ can be described in equation (20) as follows:

$$\begin{cases} r^2 = (a+1)^2 + b^2 \\ \tan\theta = \dfrac{b}{a+1} \end{cases} \quad \text{Eq. (20)}$$

In the inter-picture prediction, a merge mode can be used to improve coding efficiency. In the merge mode, the motion vector is derived from neighboring blocks and is directly used for motion compensation. In order to increase the accuracy of the MVs of the merge mode, a bilateral matching (BM) based decoder side motion vector refinement can be applied, such as in VVC. In a bi-prediction operation, a refined MV can be searched around initial MVs in a reference picture list L0 and a reference picture list L1. The BM method can calculate a distortion between two candidate blocks in the reference picture list L0 and list L1.

Figure 12:
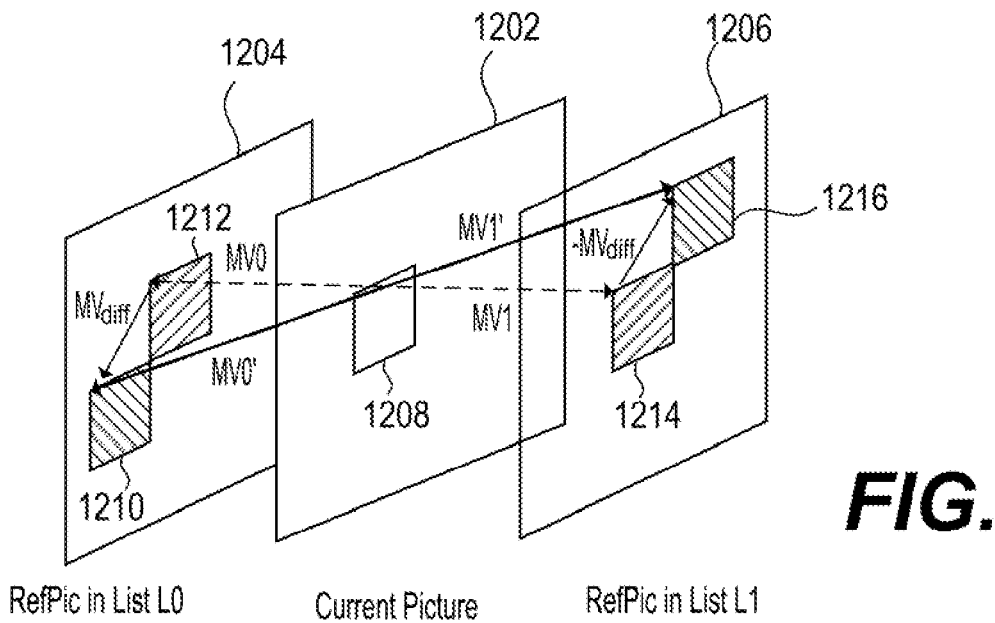
FIG. 12 shows a schematic view of a bilateral matching based decoder side motion vector refinement in some examples.

FIG. 12 shows an exemplary schematic view of a BM-based decoder side motion vector refinement. As show in FIG. 12, a current picture (1202) can include a current block (1208). The current picture can include a reference picture list L0 (1204) and a reference picture list L1 (1206). For the current block (1208), an initial reference block (1212) in the reference picture list L0 (1204) can be located according to an initial motion vector MV0 and an initial reference block (1214) in the reference picture list L1 (1206) can be located according to an initial motion vector MV1. A searching process can be performed around the initial MV0 in the reference picture list L0 (1204) and the initial MV1 in the reference picture list L1 (1206). For example, a first candidate reference block (1210) can be identified in the reference picture list L0 (1204) and a first candidate reference block (1216) can be identified in the reference picture list L1 (1206). A the sum of absolute differences (SAD) between candidate reference blocks (e.g., (1210) and (1216)) based on each MV candidate (e.g., MV0' and MV1') around the initial MV (e.g., MV0 and MV1) can be calculated. A MV candidate with the lowest SAD can become the refined MV and used to generate a bi-predicted signal to predict the current block (1208).

In some examples (e.g., VVC), DMVR is implicitly applied at the block level without the need to signal side information in the bitstream. If a block satisfies certain conditions, the DMVR algorithm is invoked. For example, the conditions (also referred to as requirement for DMVR or a set of conditions for DMVR) can include:

(1) CU level merge mode with bi-prediction MV,
(2) One reference picture is in the past and another reference picture is in the future with respect to the current picture,
(3) The distances (e.g., POC difference) from two reference pictures to the current picture are the same,
(4) Both reference pictures are short-term reference pictures,
(5) CU has more than 64 luma samples,
(6) Both CU height and CU width are larger than or equal to 8 luma samples,
(7) Bi-prediction with CU level weights (BCW) weight index indicates equal weight,
(8) weighted prediction (WP) is not enabled for the current block, and
(9) Combined inter and intra prediction (CIIP) mode is not used for the current block.

It is noted that the refined MV derived by DMVR process is used to generate the inter prediction samples and can be used in temporal motion vector prediction for future pictures coding. In some examples, the original MV is used in a deblocking process and also used in spatial motion vector prediction for future CU coding.

In some examples (e.g., VVC), decoder side motion vector refinement (DMVR) is applied to CU coded in regular merge mode. The pair of MVs obtained from the regular merge candidate is used as input of the DMVR process. DMVR applies the bilateral matching (BM) to refine the input MV pair $\{mv_{L0}, mv_{L1}\}$ and uses the refined MV pair $\{mv_{refinedL0}, mv_{refinedL1}\}$ for the motion compensated prediction of both luma and chroma components as shown in FIG. 12. The output MVs of DMVR can be referred to as refined MV pair, and can be represented by Eq. (21):

$$mv_{refinedL0} = mv_{L0} + \Delta mv$$

$$mv_{refinedL1} = mv_{L1} - \Delta mv \quad \text{Eq. (21)}$$

The motion vector difference Δmv is applied to the input MV pair to obtain the refined MV pair by using the MVD mirroring property, because the input MV pair point to two different reference pictures that have equal difference in picture order count (POC) to the current picture and these two reference pictures are at different temporal direction.

In some examples, in DMVR, a luma coded block is divided into 16×16 subblocks for the MV refinement process. The refinement search range is two integer luma samples from the initial MV. The Δmv is derived independently for each subblocks in two steps, such as an integer precision motion search step (also referred to as integer sample offset search) followed by a fractional motion search step (also referred to as fractional sample offset search). Finally, the subblock motion compensation (MC) is applied using the refined MV pair $\{mv_{refinedL0}, mv_{refinedL1}\}$.

According to an aspect of the disclosure, in the integer precision motion search step of DMVR, the search space includes 25 MV pairs of candidates that can be represented by Eq. (22):

$$mv_{L0(i,j)} = mv_{L0(0,0)} + (i,j)$$

$$mv_{L1(i,j)} = mv_{L1(0,0)} - (i,j) \quad \text{Eq. (22)}$$

where (i,j) represents the coordinate of the search point around the initial MV pair, and i and j are integer value between −2 and 2 inclusive in an example. In some examples, the SAD of the initial MV pair is first calculated and the SAD can be calculated according to Eq. (23):

$$SAD(i, j) = K \sum_{n=0}^{\frac{H}{2}} \sum_{m=0}^{W} diff_{m,n} \quad \text{Eq. (23)}$$

$$diff_{m,n} = \text{abs}(P0_{i,j}[m+i, 2n+j] - P1_{i,j}[m-i, 2n-j]) \text{ and}$$

$$K = \begin{cases} 3/4 & i = 0, j = 0 \\ 1 & \text{otherwise} \end{cases}$$

In Eq. (23), W and H denote the weight and height of the subblock, $P0_{i,j}[m+i,2n+j]$ and $P1_{i,j}[m-i,2n-j]$ denote the corresponding samples in the two reference pictures. When the SAD of the initial MV pair is smaller than a threshold, the integer precision motion search step of DMVR is terminated. Otherwise SADs of the remaining 24 points are calculated and checked for example in raster scanning order. The point with the smallest SAD is selected as the output of integer precision motion search step. In some examples, to reduce the penalty of the uncertainty of DMVR refinement, the original MV may be favored during the DMVR process. In an example, the SAD between the reference blocks referred by the initial MV candidates is decreased by ¼ of the SAD value, thus the initial MV candidates can be favored.

In the fractional motion search step (fractional sample offset search) in DMVR, the candidate MV pair selected in the integer precision motion search step (integer sample offset search step) is further refined. In some examples, to save the calculational complexity, the fractional sample refinement is derived by using parametric error surface equation, instead of additional search with SAD comparison. The fractional sample refinement is conditionally invoked based on the output of the integer sample offset search step. When the integer sample offset search step is terminated with center having the smallest SAD in either the first iteration or the second iteration search, the fractional sample refinement is further applied. In parametric error surface based sub-pixel offsets estimation, the center position cost and the costs at four neighboring positions from the center (e.g., in the first step of integer precision motion search) are used to fit a 2-D parabolic error surface equation, such as Eq. (24):

$$E(x,y) = \alpha(x-x_{min})^2 + \beta(y-y_{min})^2 + \gamma \quad \text{Eq. (24)}$$

where $(x_{min}, y_{min})$ corresponds to the fractional position with the least cost and $\gamma$ corresponds to the minimum cost value. Eq. (24) is fitted to 5 of the 25 SAD costs calculated in the first step in order to determine the 5 unknowns parameters, i.e., $\alpha, \beta, \gamma, x_{min},$ and $y_{min}$. By solving the Eq. (24) with the use of the cost values of the five search points, the $(x_{min}, y_{min})$ is computed, for example according to Eq. (25) and Eq. (26):

$$x_{min} = (E(-1,0) - E(1,0))/(2(E(-1,0) + E(1,0) - 2E(0,0))) \quad \text{Eq. (25)}$$

$$y_{min} = (E(0,-1) - E(0,1))/(2(E(0,-1) + E(0,1) - 2E(0,0))) \quad \text{Eq. (26)}$$

In Eq. (25) and Eq. (26), $E(-1,0), E(1,0), E(1,0), E(0,-1)$ and $E(0,0)$ denote the cost values at the 5 points. The value of $x_{min}$ and $y_{min}$ are automatically constrained to be between −8 and 8 since all cost values are positive and the smallest value is $E(0,0)$. The constraints correspond to half pel offset with 1/16-th-pel MV accuracy in VVC. The computed fractional $(x_{min}, y_{min})$ can be added to the integer distance refinement MV to get the sub-pixel accurate refinement delta MV.

Bilinear-interpolation and sample padding can be applied, such as in VVC. A resolution of MVs can be 1/16 luma samples, for example. Samples at a fractional position can be interpolated using an 8-tap interpolation filter. In DMVR, search points can surround an initial fractional-pel MV with an integer sample offset, therefore the samples of the fractional position need to be interpolated for DMVR search process. To reduce the calculation complexity, a bi-linear interpolation filter can be used to generate the fractional samples for the searching process in DMVR. In another important effect, by using the bi-linear filter with a 2-sample search range, the DVMR does not access more reference samples compared to a normal motion compensation process. After the refined MV is attained with a DMVR search process, the normal 8-tap interpolation filter can be applied to generate a final prediction. In order not to access more reference samples compared to a normal MC process, the samples, which may not be needed for the interpolation process based on the original MV but may be needed for the interpolation process based on the refined MV, can be padded from samples that are available.

When a width and/or a height of a CU is larger than 16 luma samples, the CU can be further split into subblocks with a width and/or a height equal to 16 luma samples. A maximum unit size for DMVR searching process can be limit to 16×16.

In some examples, multi-pass DMVR can be used. In an example, in the first pass, bilateral matching (BM) is applied to a coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

Specifically, the first pass performs block based bilateral matching MV refinement. In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1.

BM can performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW×cbH is greater than 64, a mean removed SAD (MR-SAD) cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

$$MV0\_pass1 = MV0 + deltaMV \quad \text{Eq. (27)}$$

$$MV1\_pass1 = MV1 - deltaMV \quad \text{Eq. (28)}$$

In the second pass, subblock based bilateral matching MV refinement is performed. Specifically, in the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2(sbIdx2) and MV1_pass2 (sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated by applying a cost factor to the sum of absolute transformed differences (SATD) cost between two reference subblocks, as: bilCost=satdCost×costFactor. In some examples, the search area (2×sHor+1)×(2×sVer+1) is divided up to 5 diamond shape search regions.

Figure 13:
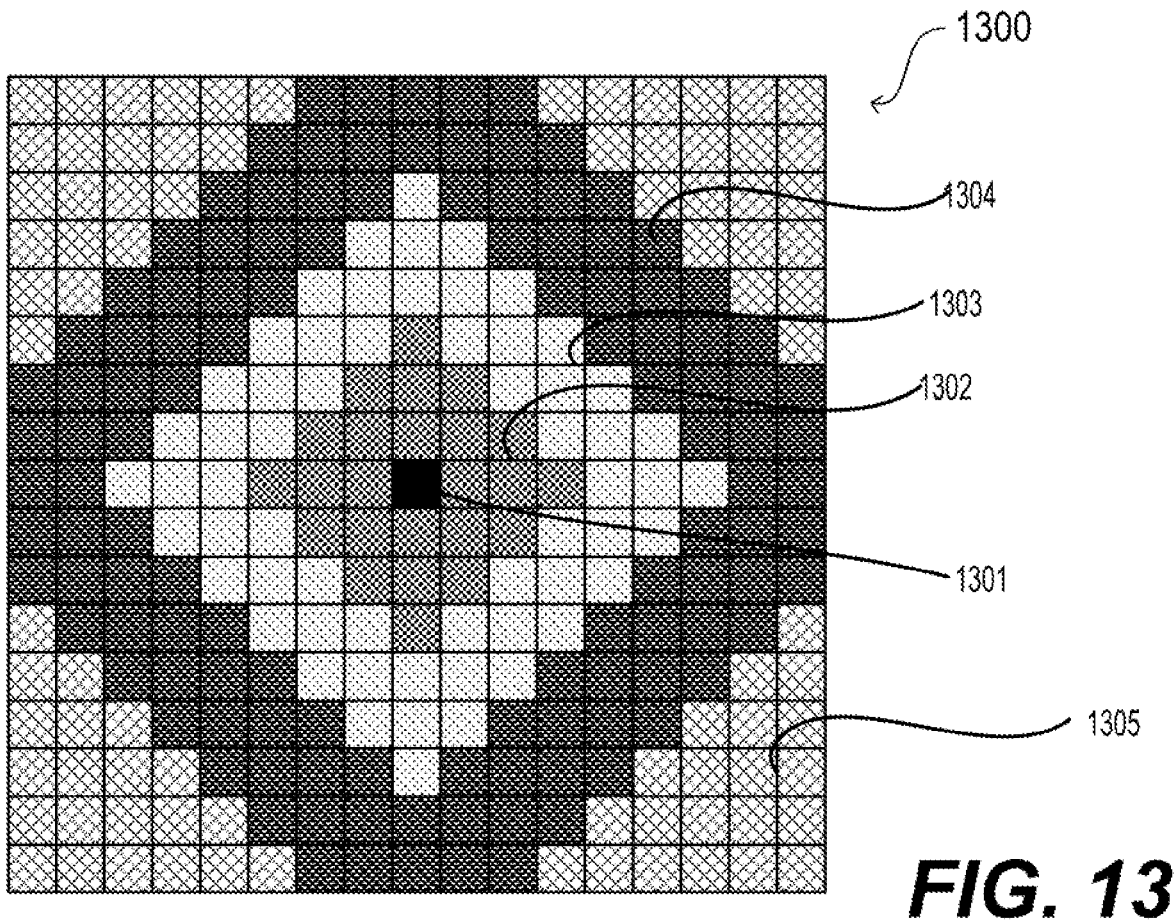
FIG. 13 shows a search area in some examples.

FIG. 13 shows a search area (1300) in some examples. The search area (1300) is divided to 5 search regions (1301)-(1305). The shape of the search regions is similar to diamond shape.

In some examples, each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW×sbH, the int-pel full search is terminated, otherwise, the int-pel full search continues to the next search region until all search points are examined. Additionally, if the difference between the previous minimum cost and the current minimum cost in the iteration is less than a threshold that is equal to the area of the block, the search process terminates.

In some examples, the fractional sample refinement, such as the DMVR fractional sample refinement in VVC, is further applied to derive the final deltaMV(sbIdx2). The refined MVs at second pass is then derived as:

$$MV0\_pass2(sbIdx2) = MV0\_pass1 + deltaMV(sbIdx2) \quad \text{Eq. (29)}$$

$$MV1\_pass2(sbIdx2) = MV1\_pass1 - deltaMV(sbIdx2) \quad \text{Eq. (30)}$$

In the third pass, subblock based bi-directional optical flow MV refinement can be performed. Specifically, in the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32. The refined MVs (MV0_pass3(sbIdx3) and MV1_pass3 (sbIdx3)) at third pass are derived as:

$$MV0\_pass3(sbIdx3) = MV0\_pass2(sbIdx2) + bioMv \quad \text{Eq. (31)}$$

$$MV1\_pass3(sbIdx3) = MV0\_pass2(sbIdx2) - bioMv \quad \text{Eq. (32)}$$

In some examples, affine merge with DMVR on translational model can be performed. In an example, refinement of the base MV (translational part of the affine model) of the affine model of the coding block coded with the affine merge mode can be performed by applying the first step of multi-pass DMVR. For example, adding a translational MV offset to all the CPMVs of the candidate in the affine merge list when the candidate meets the DMVR condition. The translational MV offset is derived by minimizing the cost of bilateral matching cost, such as in DMVR. It is noted that the DMVR condition is not changed in some examples.

It is noted that the search process for translational MV offset can be the same as the first pass of multi-pass DMVR in some examples, such as in ECM. Specifically, 3×3 square search pattern is used to loop through the search range [−8, +8] in horizontal direction and [−8, +8] in vertical direction to find the best integer MV offset. And then half pel search is conducted around the best integer position and an error surface estimation is performed to find a MV offset with 1/16 precision. The refined CPMVs can be stored for both spatial and temporal motion vector prediction as the multi-pass DMVR in ECM.

Some aspects of the present disclosure provide techniques to apply on affine model based DMVR methods or CPMV based DMVR methods that can improve the prediction accuracy for affine bi-predictions.

According to an aspect of the disclosure, multi-step (stage) bilateral matching motion refinement process (e.g., DMVR or similar method) can be applied on affine blocks (blocks coded using affine motion compensated prediction) with bi-prediction. The multi-stage bilateral matching motion refinement process refers to a motion refinement process with a plurality of stages (also referred to as steps) that determines, for a current block in a current picture, motion refinement to an initial motion model to minimize distortion errors of corresponding portions (according to the motion refinement on top of the initial motion model) in two reference pictures, one of the two reference pictures is before the current picture in a picture sequence and the other of the two reference pictures is after the current picture in the picture sequence. For affine bi-prediction, an affine model can be used to predict a block based on a first affine prediction (e.g., also referred to as first reference samples) of the block in a first reference picture and a second affine prediction (e.g., also referred to as second reference samples) of the block in a second reference picture. In some examples, encoder/decoder can start with an initial affine model with bi-prediction for a current block. The initial affine model can be determined based on any suitable techniques, such as according to affine merge mode, or affine AMVP mode. The encoder/decoder can perform a multi-stage bilateral matching motion refinement with at least a first stage and a second stage on the initial affine model to derive a refined affine model. One of the first stage and the second stage applies a first bilateral matching motion refinement on a translational component of the initial affine model, and the other of the first stage and the second stage applies a second bilateral matching motion refinement on a non-translational component of the initial affine model. Then, the current block is reconstructed using the refined affine model based on the first reference picture and the second reference picture.

In some embodiments, in a first stage of a multi-stage BM motion refinement, affine DMVR on translational component is performed to find the best translational MV offset that minimizes the bi-lateral matching cost between the pair of affine predictions respectively in two reference pictures (e.g., first reference samples in the first reference picture and second reference samples in the second reference picture). In a second stage, an affine model based bilateral matching refinement method is performed to further refine the affine model.

In an embodiment, the affine model based bilateral matching refinement process can be performed by searching for a minimal matching error within a certain search range. In an example, the search can be performed in a similar way as DMVR. Different from DMVR, the searching range can include not only the translational parts, but also the rotation and zooming factors.

In some examples of the affine model based bilateral matching refinement process, a plurality of candidate affine prediction pairs can be determined based on the search range according to the affine motion model. Each candidate affine prediction pair of the plurality of candidate affine prediction pairs can include a respective candidate affine prediction in the first reference frame and a respective candidate affine prediction in the second reference frame. A bilateral matching cost value can be calculated for each candidate affine prediction pair of the plurality of candidate affine prediction pairs. The bilateral matching cost value can indicate a difference between the candidate affine prediction in the first reference frame and the candidate affine prediction in the second reference frame. The bilateral matching cost value can be determined based on one of mean square error (MSE), mean absolute difference (MAD), SAD, sum of absolute transformed difference (SATD), or the like. In an example, an affine prediction pair in the plurality of candidate affine prediction pairs that is associated with a minimum cost value can be selected to predict the current block. For example, based on CPMVs associated with the selected affine prediction pair, an affine motion model (also referred to as affine model) can be determined. A block-level, a subblock-level, or a pixel-level prediction of the current block can further be performed based on the determined affine motion model.

It is noted that any suitable affine model can be used. The affine model can include affine parameters for translational motion, and/or rotation motion, and/or zooming motion, and/or other motion. In an example, the affine model includes zooming parameters that characterize zooming motion. In the second stage, an adjustment to the zooming parameters can be evaluated based on bilateral matching cost, such as SAD, SSE, and the like between affine predictions associated with the adjustment.

In some examples, the affine model based bilateral matching refinement can be performed by minimizing a distortion model of the affine predictions of a current block. The distortion model can be based on a first order Taylor expansion, which can be similar to the affine ME that are described with reference to FIGS. 10-11, and is referred to as a gradient based refinement iteration process in some examples.

In some examples, to perform the gradient based refinement iteration process, a distortion model (or distortion value) between the two affine predictions in a first iteration of the bilateral matching process can be provided in equations (33)-(35) as follows:

$$D_1(i,j)=P_{1,L0}(i,j)-P_{1,L1}(i,j) \qquad \text{Eq. (33)}$$

$$P_{1,L0}(i,j)=P_{0,L0}(i,j)+g_{x0,L0}(i,j)*\Delta v_{x0,L0}(i,j)+g_{y0,L0}(i,j)*\Delta v_{y0,L0}(i,j) \qquad \text{Eq. (34)}$$

$$P_{1,L1}(i,j)=P_{0,L1}(i,j)+g_{x0,L1}(i,j)*\Delta v_{x0,L1}(i,j)+g_{y0,L1}(i,j)*\Delta v_{y0,L1}(i,j) \qquad \text{Eq. (35)}$$

As shown in equation (33), $P_{1,L0}(i,j)$ can be a first iteration predictor of a current block based on a first iteration affine prediction in the reference list L0. $P_{1,L1}(i,j)$ can be a first iteration predictor of the current block based on a first iteration affine prediction in the reference list L1. (i,j) can be a location of a pixel (or sample). $D_1(i,j)$ indicates a pixel difference between the $P_{1,L0}(i,j)$ and $P_{1,L1}(i,j)$. The first iteration affine prediction in the reference list L0 can be determined by an affine motion 0 (e.g., affMV0) from the current block to the first iteration affine prediction in the reference list L0. The first iteration affine prediction in the reference list L1 can be determined by affine motion 1 (e.g., affMV1) from the current block to the first iteration affine prediction in the reference list L1.

In some examples, $P_{1,L0}(i,j)$ and $P_{1,L1}(i,j)$ can be determined according to the affine ME search process shown in FIG. 11. As shown in equation (34), $P_{0,L0}(i,j)$ can be an initial predictor of the current block based on an initial affine prediction (or base CPMVs) in the reference list L0. $g_{x0,L0}(i,j)$ can be a gradient of the initial predictor $P_{0,L0}(i,j)$ in the x direction. $g_{y0,L0}(i,j)$ can be a gradient of the initial predictor $P_{0,L0}(i,j)$ in the y direction. $\Delta v_{x0,L0}(i,j)$ can be a difference or a displacement of two affine predictions (or subblocks), such as the initial affine prediction and the first iteration affine prediction in reference list L0 along the x direction. $\Delta v_{y0,L0}(i,j)$ can be a difference or a displacement of two affine predictions (or subblocks), such as the initial affine prediction and the first iteration affine prediction in reference list L0 along the y direction.

Similarly, as shown in equation (35), $P_{0,L1}(i,j)$ can be an initial predictor of the current block based on an initial affine prediction (or base CPMVs) in the reference list L1. $g_{x0,L1}(i,j)$ can be a gradient of the initial predictor $P_{0,L1}(i,j)$ in the x direction. $g_{y0,L1}(i,j)$ can be a gradient of the initial predictor $P_{0,L1}(i,j)$ in the y direction. $\Delta v_{x0,L1}(i,j)$ can be a difference or a displacement of two affine predictions (or subblocks), such as the initial affine prediction and the first iteration affine prediction in reference list L1 along the x direction. $\Delta v_{y0,L1}(i,j)$ can be a difference or a displacement of two reference blocks (or subblocks), such as the initial affine prediction and the first iteration affine prediction in reference list L1 along the y direction.

In response to at least one of the $\Delta v_{x0,L0}(i,j)$, $\Delta v_{y0,L0}(i,j)$, $\Delta v_{x0,L1}(i,j)$, and $\Delta v_{y0,L1}(i,j)$ not being zero, the bilateral matching can then proceed to a second iteration. In the second iteration, a second predictor $P_{2,L0}(i,j)$ of the current block based on a second iteration affine prediction in the reference list L0, and a second predictor $P_{2,L1}(i,j)$ of the current block based on a second iteration affine prediction in the reference list L1 can be determined according to equations (36)-(37) as follows:

$$P_{2,L0}(i,j)=P_{1,L0}(i,j)+g_{x1,L0}(i,j)*\Delta v_{x1,L0}(i,j)+g_{y1,L0}(i,j)*\Delta v_{y1,L0}(i,j) \qquad \text{Eq. (36)}$$

$$P_{2,L1}(i,j)=P_{1,L1}(i,j)+g_{x1,L1}(i,j)*\Delta v_{x1,L1}(i,j)+g_{y1,L1}(i,j)*\Delta v_{y1,L1}(i,j) \qquad \text{Eq. (37)}$$

As shown in equation (36), $g_{x1,L1}(i,j)$ can be a gradient of the first predictor $P_{1,L0}(i,j)$ in the x direction. $g_{y1,L0}(i,j)$ can be a gradient of the first predictor $P_{1,L0}(i,j)$ in the y direction. $\Delta v_{x1,L0}(i,j)$ can be a difference or a displacement of the first iteration affine prediction and the second iteration affine prediction in reference list L0 along the x direction. $\Delta v_{y1,L0}(i,j)$ can be a difference or a displacement between the first iteration affine prediction and the second iteration affine prediction along the y direction. As shown in equation (37), $g_{x1,L1}(i,j)$ can be a gradient of the first predictor $P_{1,L1}(i,j)$ in the x direction. $g_{y1,L1}(i,j)$ can be a gradient of the first predictor $P_{1,L1}(i,j)$ in the y direction. $\Delta v_{x1,L1}(i,j)$ can be a difference or a displacement of the first iteration affine prediction and the second iteration affine prediction in reference list L1 along the x direction. $\Delta v_{y1,L1}(i,j)$ can be a difference or a displacement between the first iteration affine prediction and the second iteration affine prediction in reference list L1 along the y direction.

The second iteration affine prediction in the reference list L0 can be indicated by an affine motion 0' (e.g., affMV0') from the current block to the second iteration affine prediction in the reference list L0. The second iteration affine prediction in the reference list L1 can be indicated by affine motion 1' (e.g., affMV1') from the current block to the second iteration affine prediction in the reference list L1.

Further, a pixel difference (or a cost value) between the $P_{2,L0}(i,j)$ and $P_{2,L1}(i,j)$ can be calculated according to equation (38) as follows:

$$D_2(i,j) = P_{2,L0}(i,j) - P_{2,L1}(i,j) \qquad \text{Eq. (38)}$$

The iteration of the bilateral matching process can be terminated when an iteration number N is equal to or larger than a threshold value, or a displacement $\Delta v_{N+1,L0}(i,j)$ between a N-th iteration affine prediction in the reference list L0 and an (N+1)-th iteration affine prediction in the reference list L0 is zero, or a displacement $\Delta v_{N+1,L1}(i,j)$ between a N-th iteration affine prediction in the reference list L1 and an (N+1)-th iteration affine prediction in the reference list L1 is zero. Accordingly, N iteration affine prediction pairs can be generated based on the bilateral matching process. Each of the N iteration affine prediction pairs can include a respective iteration affine prediction in the reference list L0 and a respective iteration affine prediction in the reference list L1. Each of the N iteration affine prediction pairs can also include a respective distortion value that indicates a difference between the corresponding iteration affine prediction in the reference list L0 and the corresponding iteration affine prediction in the reference list L1.

According to the distortion values (or cost values) of the N iteration affine prediction pairs, the current block can be predicted based on a best (or selected) iteration affine prediction pair that has a minimum distortion value. For example, based on CPMVs associated with the selected iteration affine prediction pair, an affine motion model can be determined. A block-level, a subblock-level, or a pixel-level prediction of the current block can further be performed based on the determined affine motion model.

In an embodiment, during the second stage of the affine model based bilateral matching refinement, the gradient based refinement iteration process stops when the maximum iteration number is reached, or when the delta affine parameters are not changed. The final delta affine parameters are used to derive the final affine CPMVs on top of the refined CPMV values from the first stage of translational refinement.

In another embodiment, during the second stage of the affine model based bilateral matching refinement, the gradient based refinement iteration process stops when the maximum iteration number is reached, or when the delta affine parameters are not changed. In each iteration, the bilateral matching cost between the pair of affine predictions (e.g., of the reference samples in the reference pictures) are stored along with the refined CPMV values in a list. At the end of the iterations, the CPMV values with the lowest bilateral matching cost are used as the final refined CPMV values.

In some embodiments, in the first stage, the affine model based bilateral matching refinement is applied to refine the affine model. Subsequently, in the second stage, the translational MV offset is refined to generate the final CPMVs.

In an embodiment, during the first stage of the affine model based bilateral matching refinement, the gradient based refinement iteration process stops when the maximum iteration number is reached, or when the delta affine parameters are not changed. The final delta affine parameters are used to derive the final affine CPMVs on top of the refined CPMV values from the first stage of translational refinement.

In another embodiment, during the first stage of the affine model based bilateral matching refinement, the gradient based refinement iteration process stops when the maximum iteration number is reached, or when the delta affine parameters are not changed. In each iteration, the bilateral matching cost between the pair of affine predictions (e.g., reference samples in the reference pictures) are stored along with the refined CPMV values in a list. At the end of the iterations, the CPMV values with the lowest bilateral matching cost are used as the final refined CPMV values.

In some embodiments, in addition to a stage of affine DMVR on translational component and a stage of affine model based bilateral matching refinement, the multi-stage bilateral matching motion refinement process can include another stage (referred to as the third stage) to perform refinement on one or more of the CPMVs. The third stage can be performed before or after any of the first stage and/or the second stage.

In an embodiment, the third stage can include a plurality of iterations to refine control points. In an example, each iteration is associated with MV offsets in certain range. In each iteration, control points are refined sequentially in the iteration. In an iteration, for a control point, refinements are applied to the CPMV of the control point to minimize bilateral matching cost between a pair of affine predictions in the two reference pictures. For example, for a refinement, a pair of refined CPMV values for the reference picture L0 and the reference picture L1 is generated, and corresponding affine predictions (also referred to as reference samples for the current block) in the reference picture L0 and the reference picture L1 are determined, and bilateral matching cost is calculated as, for example, SAD between the two affine predictions in the reference picture L0 and the reference picture L1. In the iteration, the refined CPMV values of a control point that can achieve a lowest bilateral matching cost are determined for the control point, and used as base for a next iteration, or as final CPMV values of the control point when the iteration is the last iteration.

In another embodiment, the third stage can include a plurality of iterations to refine control points. In an example, each iteration is associated with a control point, and can apply various MV offsets to refine CPMV values for the control point. In an iteration for a control point, refinements are applied to the CPMV of the control point to minimize bilateral matching cost between a pair of affine predictions in the two reference pictures. For example, for a refinement, a pair of refined CPMV values for the reference picture L0 and the reference picture L1 is generated, and corresponding affine predictions (also referred to as reference samples for the current block) in the reference picture L0 and the reference picture L1 are determined, and bilateral matching cost is calculated as, for example, SAD between the pair of affine predictions in the reference picture L0 and the reference picture L1. In the iteration, the refined CPMV values of the control point that can achieve a lowest bilateral matching cost are used for the control point, and used as base for a next iteration, or as final CPMV values of the control point when the iteration is the last iteration.

In another embodiment, a combination of N CPMVs can be refined together in each iteration. In an iteration, multiple MV offsets may be tested as steps of refinement, each step of the refinement has the same pair of MV offsets (with opposite signs on L0 and L1) applied to the CPMVs in the combination of N CPMVs to be refined. The resulting set of N CPMVs with the best (e.g., lowest) bilateral matching cost in the iteration is kept for those control points and used as base for next iteration, or as final CPMV values when the iterations are finished. Each possible set of N CPMVs can be refined in separate iterations subsequently. In one example, N is equal to 2. In an example, the block has three control points that are referred to as a first control point, second control point and third control point. In a first iteration, a combination of CPMVs for the first control point and the second control point are refined. In a second iteration, a combination of CPMVs for the first control point and the third control point are refined. In a third iteration, a combination of CPMVs for the second control point and the third control point are refined.

According to an aspect of the disclosure, DMVR refinement can be applied on subblocks of the affine block (e.g., a block by affine motion compensation prediction). The subblocks of the affine block are also referred to as affine subblocks.

In an embodiment, the DMVR refinement applied on a subblock of the affine block is performed in a same manner as the DMVR refinement for regular bi-prediction inter block. For example, each subblock of the affine block is treated as a regular bi-prediction inter block, and DMVR refinement is applied on the subblock.

In some examples, each affine subblock (e.g., a subblock in the affine block) is refined individually, and the final refined MV of the affine subblock is used in the motion compensation of the affine subblock.

In some examples, the refined MV of a subblock is used for motion compensation only, and is not stored in MV buffer (e.g., the 4×4 inter MV buffer as in VTM, and/or the temporal MV buffer) for the subblock. The subblock's MV buffer stores the subblock MV before the DMVR refinement for the subblock.

In some examples, the refined MV of a subblock is stored to the MV buffer of the subblock.

In some examples, the refined MV of a subblock is used for motion compensation only, and is not used as the MVP candidate for other blocks.

In some examples, all the refined subblock MVs (e.g., refined MVs of the subblocks) are used as input for a regression model to derive CPMVs of the affine block.

In an example, the CPMVs derived by regression model are used for affine motion compensation of the affine block. In an example, the original CPMVs are stored for the affine block (and/or the affine history candidate buffer) to be used for affine inheritance by other blocks.

In another example, the CPMVs derived by regression model are used for affine motion compensation of the affine block, and are stored for the affine block (and/or the affine history buffer) to be used for affine inheritance by other blocks.

In some embodiments, the original CPMVs are stored for the affine block (and/or affine history candidate buffer), to be used later, such as for inherited affine merge or inherited affine MVP candidate derivation by other blocks.

Figure 14:
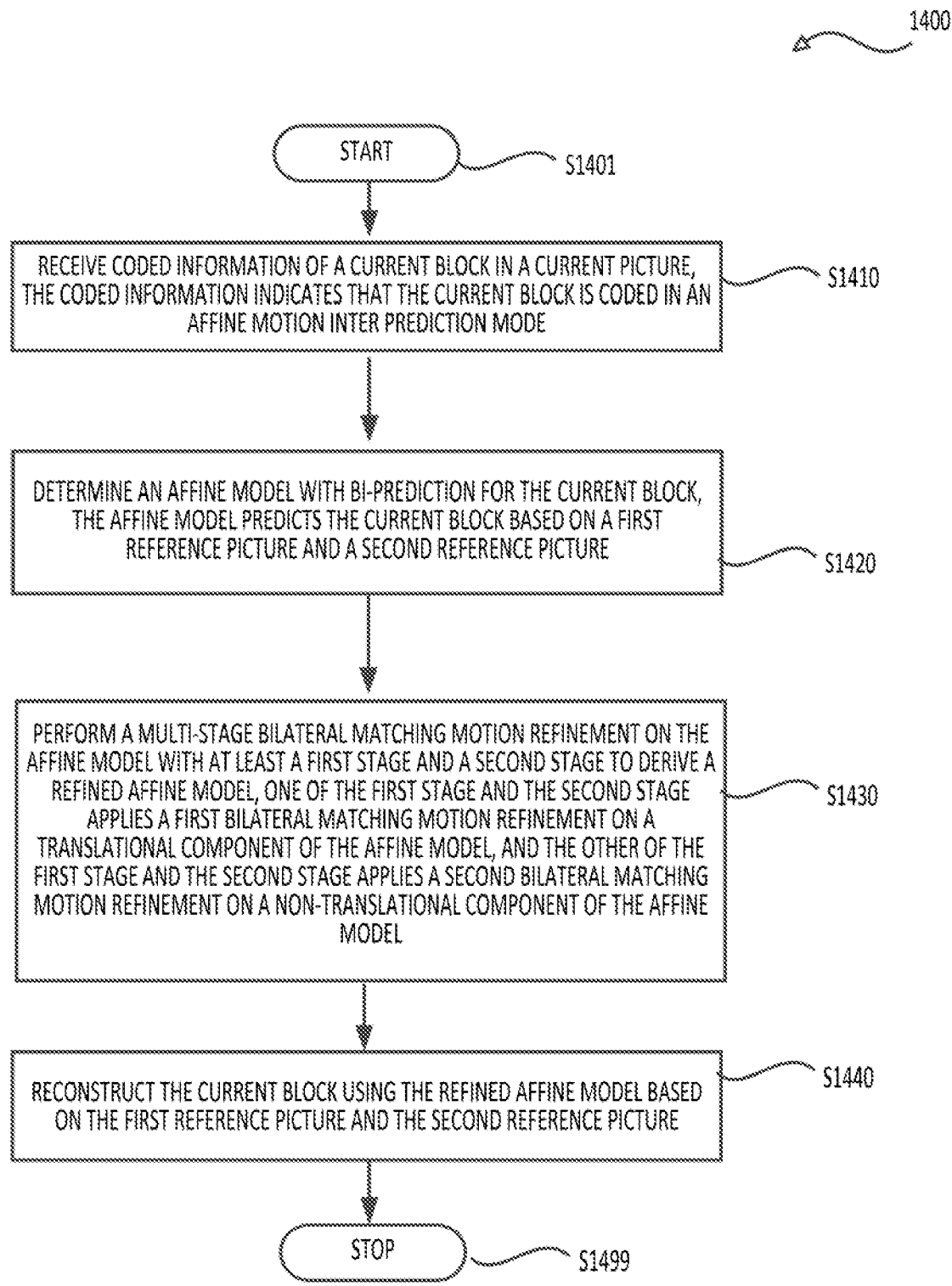
FIG. 14 shows a flow chart outlining a process according to some embodiment of the disclosure.

FIG. 14 shows a flow chart outlining a process (1400) according to an embodiment of the disclosure. The process (1400) can be used in a video decoder. In various embodiments, the process (1400) is executed by processing circuitry, such as the processing circuitry that performs functions of the video decoder (110), the processing circuitry that performs functions of the video decoder (210), and the like. In some embodiments, the process (1400) is implemented in software instructions, thus when the processing circuitry executes the software instructions, the processing circuitry performs the process (1400). The process starts at (S1401) and proceeds to (S1410).

At (S1410), coded information of a current block in a current picture is received. The coded information indicates that the current block is coded in an affine motion inter prediction mode.

At (S1420), an initial affine model with bi-prediction is determined for the current block. The initial affine model predicts the current block based on a first reference picture and a second reference picture. The initial affine model can be determined based on any suitable techniques, such as according to affine merge mode, or affine AMVP mode.

At (S1430), a multi-stage bilateral matching motion refinement with at least a first stage and a second stage is performed on the initial affine model to derive a refined affine model. One of the first stage and the second stage applies a first bilateral matching motion refinement on a translational component of the initial affine model, and the other of the first stage and the second stage applies a second bilateral matching motion refinement on a non-translational component of the initial affine model.

At (S1440), the current block is reconstructed using the refined affine model based on the first reference picture and the second reference picture.

In some embodiments, to perform the multi-stage bilateral matching motion refinement, the first bilateral matching motion refinement is performed on the translational component in the first stage before the second stage, and the second bilateral matching motion refinement is performed on the non-translational component in the second stage after the first stage.

In some embodiments, to perform the multi-stage bilateral matching motion refinement, the second bilateral matching motion refinement is performed on the non-translational component in the first stage before the second stage, and the first bilateral matching motion refinement is performed on the translational component in the second stage after the first stage.

In some examples, for the first bilateral matching motion refinement, a motion vector offset is determined to be applied to each of control point motion vectors of the initial affine model to minimize a bilateral matching cost value between a first affine prediction in the first reference picture and a second affine prediction in the second reference picture. In an example, each control point has a pair of control point motion vectors, one of the control point motion vectors is for prediction according to the first reference picture, and the other of the control point motion vectors is for prediction according to the second reference picture. The motion vector offset can be applied to the pair of control point motion vectors in opposite directions. In an example, when the initial affine model has two control points, the motion vector offset is applied on four control point motion vectors. In another example, when the initial affine model has three control points, the motion vector offset is applied to six control point motion vectors.

In some examples, for the second bilateral matching motion refinement, in a gradient based refinement iteration associated with a current affine model, a prediction output of the current block is generated according to the current affine model. Then, gradients of prediction samples in the prediction output are calculated. A linear equation formed by the gradients is solved to determine respectively delta values of control point motion vectors for control points of the block. Further, whether one or more stop conditions are satisfied is determined. In response to none of the one or more stop conditions being satisfied, a next affine model is determined based on the delta values of the control point motion vectors. The next affine model is input to a next gradient based refinement iteration. In response to the one or more stop conditions being satisfied, the second bilateral matching motion refinement is stopped.

In an example, in response to the one or more stop conditions being satisfied, delta control point motion vectors for respective control point motion vectors are determined based on a last affine model used in a last gradient based refinement iteration of the second bilateral matching motion refinement.

In an example, a plurality of bilateral matching costs are stored, each of the plurality of bilateral matching cost is associated with an affine model used in one of a plurality of gradient based refinement iterations of the second bilateral matching motion refinement. For example, a bilateral matching cost associated with an affine model in a gradient based refinement iteration is calculated as an SAD between a first affine prediction in a first reference picture and a second affine prediction in a second reference picture. A lowest bilateral matching cost in the plurality of bilateral matching costs is determined. Then, delta control point motion vectors for respective control point motion vectors are determined based on an affine model associated with the lowest bilateral matching cost.

In some examples, the refined affine model is formed by refined control point motion vectors, the refined control point motion vectors include a motion vector offset that is derived by the first bilateral matching motion refinement and is applied to each of the refined control point motion vectors, and include delta control point motion vectors that are derived by the second bilateral matching motion refinement and are applied on respective control point motion vectors.

In some examples, the multi-stage bilateral matching motion refinement on the affine model includes at least a third stage that applies a third bilateral matching motion refinement on control point motion vectors of the affine model. In an example, the third stage is performed before the first stage and the second stage. In another example, the third stage is performed between the first stage and the second stage. In another example, the third stage is performed after the first stage and the second stage.

In some examples, the third stage applies a third bilateral matching motion refinement having one or more iterations respectively for one or more control points of the current block. For example, in an iteration for a control point, a pair of refined control point motion vectors at the control point is determined, the pair of refined control point motion vectors at the control point minimizes a bilateral matching cost between a first affine prediction in the first reference picture and a second affine prediction in the second reference picture.

In some examples, the third stage applies a third bilateral matching motion refinement having one or more iterations respectively for one or more combinations of N control points, N is a positive integer larger than 1 and smaller than a total number of control points. In an example, N is 2. In some examples, in an iteration for a combination of N control points, a same pair of motion vector offsets to apply to each pair of control point motion vectors at the N control points in the combination is determined. The pair of motion vector offsets minimizes a bilateral matching cost value between a first affine prediction in the first reference picture and a second affine prediction in the second reference picture.

According to an aspect of the disclosure, DMVR refinement can be applied to subblocks of the current block that is in the affine motion inter prediction mode. In some examples, a first motion vector for a subblock of the current block coded in the affine motion inter prediction mode is determined according to the affine model. A decoder side motion vector refinement (DMVR) to determine a second motion vector with a refinement on the first motion vector is performed for the subblock. The second motion vector with the refinement on the first motion vector minimizes a bilateral matching cost between a first reference subblock in the first reference picture and a second reference subblock in the second reference picture. The subblock is then reconstructed according to the second motion vector for the subblock.

In some examples, the first motion vector is stored in a subblock buffer for the subblock, the first motion vector in the subblock buffer can be used for motion vector prediction for another block. In some examples, the second motion vector is stored in a subblock buffer for the subblock, the second motion vector in the subblock buffer can be used for motion vector prediction for another block.

In some examples, refined motion vectors respectively for subblocks of the current block are determined. A regression model is determined based on the refined motion vectors for the subblocks. Refined control point motion vectors for the refined affine model of the current block are determined according to the regression model. The current block can be reconstructed according to the refined control point motion vectors.

In some examples, control point motion vectors of the initial affine model (initial affine model before the multi-stage bilateral matching refinement) are stored in a buffer associated with the current block, the control point motion vectors can be used for an affine inheritance by other blocks.

In some examples, the refined control point motion vectors of the refined affine model (refined affine model after the multi-stage bilateral matching refinement) are stored in a buffer associated with the current block, the refined control point motion vectors can be used for an affine inheritance by other blocks.

Then, the process proceeds to (S1499) and terminates.

The process (1400) can be suitably adapted. Step(s) in the process (1400) can be modified and/or omitted. Additional step(s) can be added. Any suitable order of implementation can be used.

Figure 15:
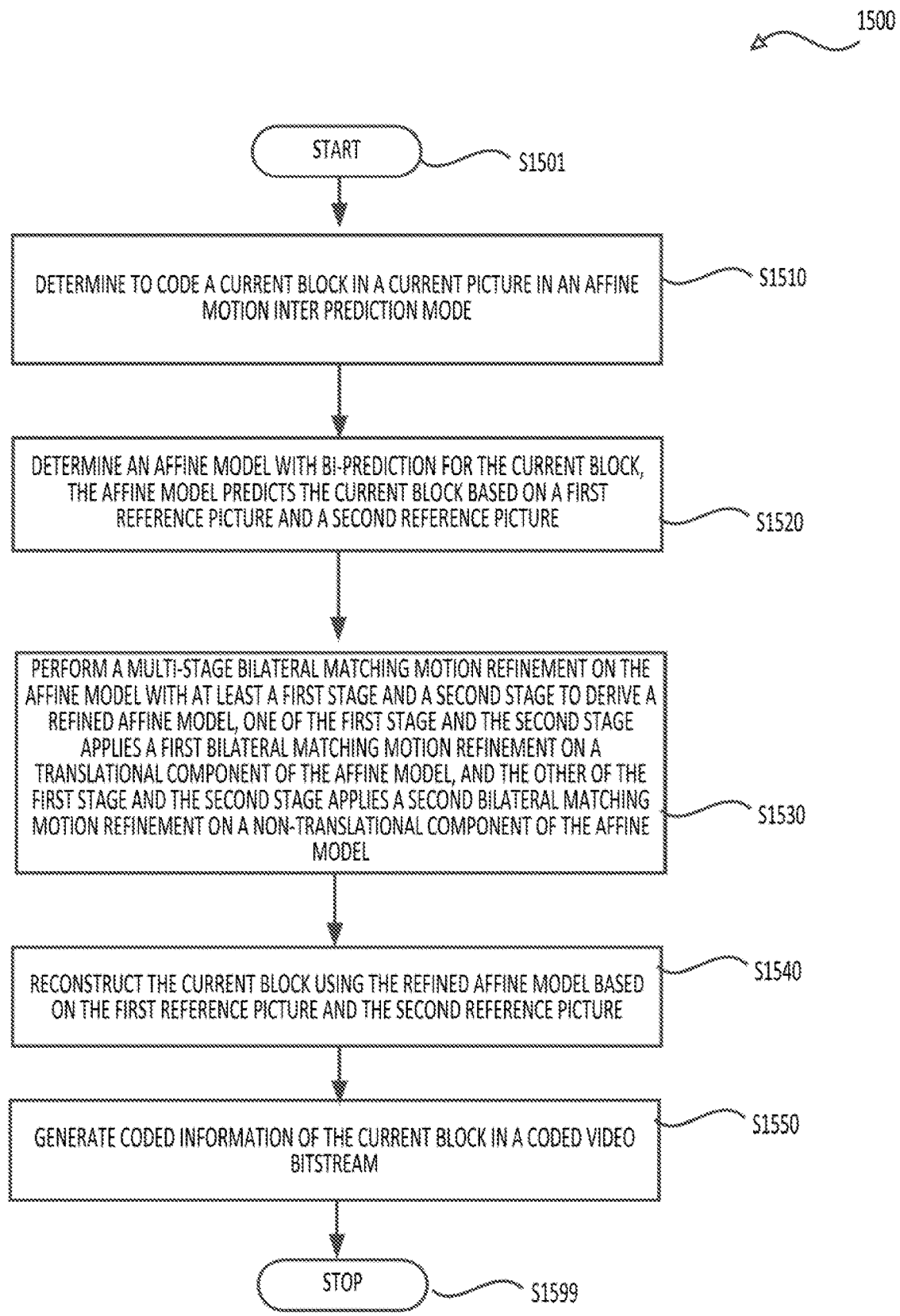
FIG. 15 shows a flow chart outlining another process according to some embodiment of the disclosure.

FIG. 15 shows a flow chart outlining a process (1500) according to an embodiment of the disclosure. The process (1500) can be used in a video encoder. In various embodiments, the process (1500) is executed by processing circuitry, such as the processing circuitry that performs functions of the video encoder (103), the processing circuitry that performs functions of the video encoder (303), and the like. In some embodiments, the process (1500) is implemented in software instructions, thus when the processing circuitry executes the software instructions, the processing circuitry performs the process (1500). The process starts at (S1501) and proceeds to (S1510).

At (S1510), to code a current block in a current picture in an affine motion inter prediction mode is determined.

At (S1520), an initial affine model with bi-prediction is determined for the current block. The initial affine model with bi-prediction predicts the current block based on a first reference picture and a second reference picture.

At (S1530), a multi-stage bilateral matching motion refinement with at least a first stage and a second stage is performed on the initial affine model to derive a refined affine model, one of the first stage and the second stage applies a first bilateral matching motion refinement on a translational component of the initial affine model, and the other of the first stage and the second stage applies a second bilateral matching motion refinement on a non-translational component of the initial affine model.

At (S1540), the current block is reconstructed using the refined affine model based on the first reference picture and the second reference picture.

At (S1550), coded information for the current block is generated in a coded video bitstream.

In some embodiments, to perform the multi-stage bilateral matching motion refinement, the first bilateral matching motion refinement is performed on the translational component in the first stage before the second stage, and the second bilateral matching motion refinement is performed on the non-translational component in the second stage after the first stage.

In some embodiments, to perform the multi-stage bilateral matching motion refinement, the second bilateral matching motion refinement is performed on the non-translational component in the first stage before the second stage, and the first bilateral matching motion refinement is performed on the translational component in the second stage after the first stage.

In some examples, for the first bilateral matching motion refinement, a motion vector offset is determined to apply to each of control point motion vectors of the initial affine model to minimize a bilateral matching cost value between a first affine prediction in the first reference picture and a second affine prediction in the second reference picture. In an example, each control point has a pair of control point motion vectors, one of the control point motion vectors is for prediction according to the first reference picture, and the other of the control point motion vectors is for prediction according to the second reference picture. The motion vector offset can be applied to the pair of control point motion vectors in opposite directions. In an example, when the initial affine model has two control points, the motion vector offset is applied on four control point motion vectors. In another example, when the initial affine model has three control points, the motion vector offset is applied to six control point motion vectors.

In some examples, for the second bilateral matching motion refinement, in a gradient based refinement iteration associated with a current affine model, a prediction output of the current block is generated according to the current affine model. Then, gradients of prediction samples in the prediction output are calculated. A linear equation formed by the gradients is solved to determine respectively delta values of control point motion vectors for control points of the block. Further, whether one or more stop conditions are satisfied is determined. In response to none of the one or more stop conditions being satisfied, a next affine model is determined based on the delta values of the control point motion vectors. The next affine model is input to a next gradient based refinement iteration. In response to the one or more stop conditions being satisfied, the second bilateral matching motion refinement is stopped.

In an example, in response to the one or more stop conditions being satisfied, delta control point motion vectors for respective control point motion vectors are determined based on a last affine model used in a last gradient based refinement iteration of the second bilateral matching motion refinement.

In an example, a plurality of bilateral matching costs are stored, each of the plurality of bilateral matching cost is associated with an affine model used in one of a plurality of gradient based refinement iterations of the second bilateral matching motion refinement. For example, a bilateral matching cost associated with an affine model in a gradient based refinement iteration is calculated as an SAD between a first affine prediction of the current block in a first reference picture and a second affine prediction of the current block in a second reference picture. A lowest bilateral matching cost is determined from the plurality of bilateral matching costs. Then, delta control point motion vectors for respective control point motion vectors are determined based on an affine model associated with the lowest bilateral matching cost.

In some examples, the refined affine model is formed by refined control point motion vectors, the refined control point motion vectors include a motion vector offset that is derived by the first bilateral matching motion refinement and is applied to each of the refined control point motion vectors, and include delta control point motion vectors that are derived by the second bilateral matching motion refinement and are applied on respective control point motion vectors.

In some examples, the multi-stage bilateral matching motion refinement on the affine model includes at least a third stage that applies a third bilateral matching motion refinement on control point motion vectors of the affine model. In an example, the third stage is performed before the first stage and the second stage. In another example, the third stage is performed between the first stage and the second stage. In another example, the third stage is performed after the first stage and the second stage.

In some examples, the third stage applies a third bilateral matching motion refinement having one or more iterations respectively for one or more control points of the current block. For example, in an iteration for a control point, a pair of refined control point motion vectors at the control point is determined, the pair of refined control point motion vectors at the control point minimizes a bilateral matching cost between a first affine prediction in the first reference picture and a second affine prediction in the second reference picture.

In some examples, the third stage applies a third bilateral matching motion refinement having one or more iterations respectively for one or more combinations of N control points, N is a positive integer larger than 1 and smaller than a total number of control points. In an example, N is 2. In some examples, in an iteration for a combination of N control points, a same pair of motion vector offsets to apply to each pair of control point motion vectors at the N control points in the combination is determined. The pair of motion vector offsets minimizes a bilateral matching cost value between a first affine prediction in the first reference picture and a second affine prediction in the second reference picture.

According to an aspect of the disclosure, DMVR refinement can be applied to subblocks of the current block that is in the affine motion inter prediction mode. In some examples, a first motion vector for a subblock of the current block coded in the affine motion inter prediction mode is determined according to the affine model. A decoder side motion vector refinement (DMVR) to determine a second motion vector with a refinement on the first motion vector is performed for the subblock. The second motion vector with the refinement on the first motion vector minimizes a bilateral matching cost between a first reference subblock in the first reference picture and a second reference subblock in the second reference picture. The subblock is then reconstructed according to the second motion vector for the subblock.

In some examples, the first motion vector is stored in a subblock buffer for the subblock, the first motion vector in the subblock buffer can be used for motion vector prediction for another block. In some examples, the second motion vector is stored in a subblock buffer for the subblock, the second motion vector in the subblock buffer can be used for motion vector prediction for another block.

In some examples, refined motion vectors respectively for subblocks of the current block are determined. A regression model is determined based on the refined motion vectors for the subblocks. Refined control point motion vectors for the refined affine model of the current block are determined according to the regression model. The current block can be reconstructed according to the refined control point motion vectors.

In some examples, control point motion vectors of the initial affine model (initial affine model before the multi-stage bilateral matching refinement) are stored in a buffer associated with the current block, the control point motion vectors can be used for an affine inheritance by other blocks.

In some examples, the refined control point motion vectors of the refined affine model (refined affine model after the multi-stage bilateral matching refinement) are stored in a buffer associated with the current block, the refined control point motion vectors can be used for an affine inheritance by other blocks.

Then, the process proceeds to (S1599) and terminates.

The process (1500) can be suitably adapted. Step(s) in the process (1500) can be modified and/or omitted. Additional step(s) can be added. Any suitable order of implementation can be used.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
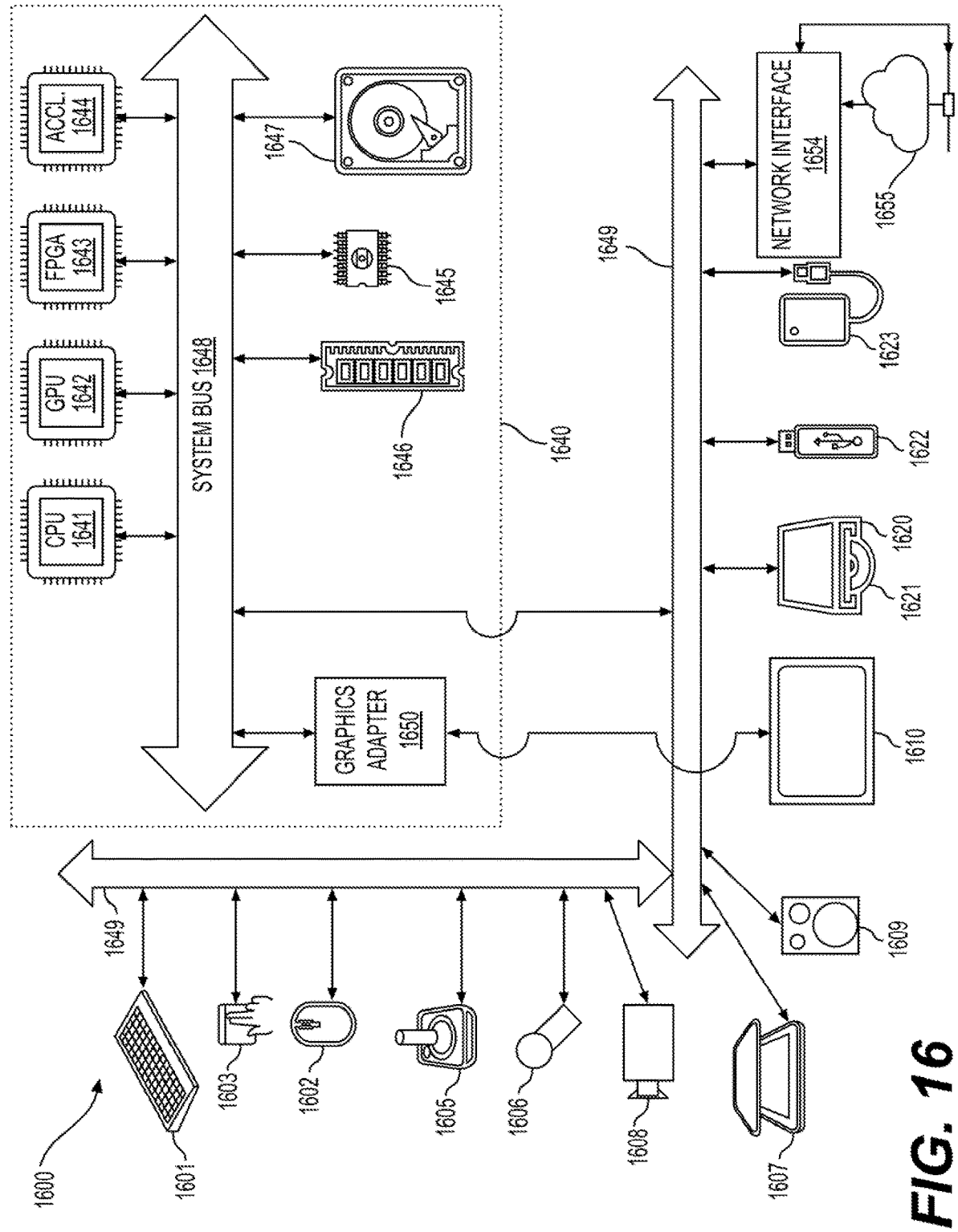
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving coded information of a current block in a current picture, the coded information indicating that the current block is coded in an affine motion inter prediction mode;
determining an initial affine model with bi-prediction for the current block, the initial affine model predicting the current block based on a first reference picture and a second reference picture;
performing a multi-stage bilateral matching motion refinement with at least a first stage and a second stage on the initial affine model to derive a refined affine model, performing the multi-stage bilateral matching motion refinement comprising:
during one of the first stage and the second stage, applying a first bilateral matching motion refinement on a translational component of the initial affine model; and
during the other of the first stage and the second stage, applying a second bilateral matching motion refinement on a non-translational component of the initial affine model; and
reconstructing the current block using the refined affine model based on the first reference picture and the second reference picture.

2. The method of claim 1, wherein the performing the multi-stage bilateral matching motion refinement further comprises:
applying the first bilateral matching motion refinement on the translational component in the first stage before the second stage; and
applying the second bilateral matching motion refinement on the non-translational component in the second stage after the first stage.

3. The method of claim 1, wherein the performing the multi-stage bilateral matching motion refinement further comprises:
applying the second bilateral matching motion refinement on the non-translational component in the first stage before the second stage; and
applying the first bilateral matching motion refinement on the translational component in the second stage after the first stage.

4. The method of claim 1, wherein the performing the multi-stage bilateral matching motion refinement further comprises:
for the first bilateral matching motion refinement, determining a motion vector offset to apply to each of control point motion vectors of the initial affine model to minimize a bilateral matching cost value between a first affine prediction in the first reference picture and a second affine prediction in the second reference picture.

5. The method of claim 1, wherein the performing the multi-stage bilateral matching motion refinement further comprises:
for the second bilateral matching motion refinement:
determining, in a gradient based refinement iteration associated with a current affine model, a prediction output of the current block according to the current affine model;
calculating gradients of prediction samples in the prediction output;
solving a linear equation formed by the gradients to determine respectively delta values of control point motion vectors;
determining whether one or more stop conditions are satisfied;
determining a next affine model based on the delta values of the control point motion vectors in response to none of the one or more stop conditions being satisfied, the next affine model being input to a next gradient based refinement iteration; and
stopping the second bilateral matching motion refinement in response to the one or more stop conditions being satisfied.

6. The method of claim 5, further comprising:
in response to the one or more stop conditions being satisfied, determining, delta control point motion vectors for respective control point motion vectors based on a last affine model in a last gradient based refinement iteration of the second bilateral matching motion refinement.

7. The method of claim 5, further comprising:
storing, a plurality of bilateral matching costs that each is associated with an affine model used in one of a plurality of gradient based refinement iterations of the second bilateral matching motion refinement;
determining, a lowest bilateral matching cost from the plurality of bilateral matching costs; and
determining, delta control point motion vectors for respective control point motion vectors based on an affine model associated with the lowest bilateral matching cost.

8. The method of claim 1, wherein the refined affine model is formed by refined control point motion vectors, the refined control point motion vectors comprise a motion vector offset that is derived by the first bilateral matching motion refinement and is applied to each of the refined control point motion vectors, and delta control point motion vectors that are derived by the second bilateral matching motion refinement and are applied on respective control point motion vectors.

9. The method of claim 1, wherein the multi-stage bilateral matching motion refinement on the initial affine model comprises at least a third stage that applies a third bilateral matching motion refinement on control point motion vectors at control points of the current block.

10. The method of claim 9, wherein the third stage is performed before the first stage and the second stage, or the third stage is performed between the first stage and the second stage, or the third stage is performed after the first stage and the second stage.

11. The method of claim 9, wherein the third stage applies a third bilateral matching motion refinement having one or more iterations respectively for one or more control points of the current block, and the method further comprises:
determining, in an iteration for a control point, a pair of refined control point motion vectors at the control point, that minimizes a bilateral matching cost between a first affine prediction in the first reference picture and a second affine prediction in the second reference picture.

12. The method of claim 9, wherein the third stage applies a third bilateral matching motion refinement having one or more iterations respectively for one or more combinations of N control points, N is a positive integer larger than 1 and smaller than a total number of control points, the method further comprises:
determining, in an iteration for a combination of N control points, a motion vector offset to apply to each of control point motion vectors at the N control points in the combination that minimizes a bilateral matching cost value between a first affine prediction in the first reference picture and a second affine prediction in the second reference picture.

13. The method of claim 1, wherein the performing the multi-stage bilateral matching motion refinement further comprises:
determining a first motion vector for a subblock of the current block coded in the affine motion inter prediction mode according to the initial affine model;
applying a decoder side motion vector refinement (DMVR) to determine a second motion vector with a refinement on the first motion vector for the subblock, the second motion vector with the refinement on the first motion vector minimizing a bilateral matching cost between a first reference subblock in the first reference picture and a second reference subblock in the second reference picture; and
reconstructing the subblock according to the second motion vector for the subblock.

14. The method of claim 13, further comprising:
storing the first motion vector in a subblock buffer for the subblock, the first motion vector in the subblock buffer being used for motion vector prediction for another block.

15. The method of claim 13, further comprising:
storing the second motion vector in a subblock buffer for the subblock, the second motion vector in the subblock buffer being used for motion vector prediction for another block.

16. The method of claim 13, further comprising:
determining refined motion vectors respectively for subblocks of the current block;
determining a regression model based on the refined motion vectors for the subblocks;

deriving refined control point motion vectors for the refined affine model of the current block according to the regression model; and reconstructing the current block according to the refined control point motion vectors.

17. The method of claim 16, further comprising:

storing control point motion vectors of the initial affine model in a buffer associated with the current block, the control point motion vectors being used for an affine inheritance.

18. The method of claim 16, further comprising:

storing the refined control point motion vectors of the refined affine model in a buffer associated with the current block, the refined control point motion vectors being used for an affine inheritance.

19. The method of claim 1, further comprising:

storing control point motion vectors of the initial affine model in a buffer associated with the current block, the control point motion vectors being used for an affine inheritance.

20. An apparatus for video decoding, comprising processing circuitry configured to:

receive coded information of a current block in a current picture, the coded information indicating that the current block is coded in an affine motion inter prediction mode;

determine an initial affine model with bi-prediction for the current block, the initial affine model predicting the current block based on a first reference picture and a second reference picture;

perform a multi-stage bilateral matching motion refinement with at least a first stage and a second stage on the initial affine model to derive a refined affine model, one of the first stage and the second stage applying a first bilateral matching motion refinement on a translational component of the initial affine model, and the other of the first stage and the second stage applying a second bilateral matching motion refinement on a non-translational component of the initial affine model; and reconstruct the current block using the refined affine model based on the first reference picture and the second reference picture.

* * * * *